(12) United States Patent
Kuwahara et al.

(10) Patent No.: US 8,608,392 B2
(45) Date of Patent: Dec. 17, 2013

(54) IMAGING APPARATUS

(75) Inventors: Masato Kuwahara, Kyoto (JP);
Kazunori Koshiishi, Kyoto (JP); Yui Ehara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/451,958

(22) Filed: Apr. 20, 2012

(65) Prior Publication Data
US 2012/0200758 A1 Aug. 9, 2012

Related U.S. Application Data

(62) Division of application No. 12/149,920, filed on May 9, 2008, now Pat. No. 8,177,441.

(30) Foreign Application Priority Data

Aug. 29, 2007 (JP) ................................. 2007-222472
May 1, 2008 (JP) ................................. 2008-119641

(51) Int. Cl.
*G03B 17/38* (2006.01)
(52) U.S. Cl.
USPC .......................................... 396/502; 396/540
(58) Field of Classification Search
USPC .................................. 396/502–503, 540–541
See application file for complete search history.

(56) References Cited

U.S. PATENT DOCUMENTS

| | | | |
|---|---|---|---|
| 4,007,469 A * | 2/1977 | Land et al. .................... | 396/169 |
| 4,408,287 A * | 10/1983 | Parisot et al. ................ | 353/27 A |
| 5,408,287 A | 4/1995 | Winegarden et al. | |
| 5,923,908 A | 7/1999 | Schrock et al. | |
| 6,069,648 A | 5/2000 | Suso et al. | |
| 6,120,379 A | 9/2000 | Tanaka et al. | |
| 6,154,210 A | 11/2000 | Anderson | |
| 6,259,597 B1 | 7/2001 | Anzai et al. | |
| 6,466,202 B1 | 10/2002 | Suso et al. | |

(Continued)

FOREIGN PATENT DOCUMENTS

EP 1 267 576 12/2002
JP 01-297986 12/1989

(Continued)

OTHER PUBLICATIONS

Oryl, Michael, "Verizon shows LG VX9800 EV-DO Communicator" Mobileburn, Sep. 20, 2005, Archived Nov. 25, 2006 by www.Archive.org accessed Jul. 18, 2011. http://web.archive.org/web/20061121 60046/http://www.mobileburn.com/review.jsp?Page=2&Id=1656.

(Continued)

*Primary Examiner* — Clayton E Laballe
*Assistant Examiner* — Leon W Rhodes, Jr.
(74) *Attorney, Agent, or Firm* — Nixon & Vanderhye P.C.

(57) ABSTRACT

An imaging apparatus 10 comprises a lower housing 11, an upper housing 21, an outer camera 25, and at least one photographing button (buttons 14H and 14G). The upper housing 21 is connected to an upper surface of the lower housing 11 such that the upper housing 21 and the lower housing 11 are foldable. The outer camera 25 is provided in an outer surface of the upper housing 21 which is located outside when the two housings 11 and 21 are folded. The at least one photographing button is provided on an upper surface of the lower housing 11 for performing an instruction to sore an image taken by the outer camera 25.

13 Claims, 21 Drawing Sheets

(56) References Cited

U.S. PATENT DOCUMENTS

| | | | |
|---|---|---|---|
| 6,510,325 B1 | 1/2003 | Mack et al. | |
| 6,567,677 B1 | 5/2003 | Sokoloff | |
| D492,275 S | 6/2004 | Lin et al. | |
| 6,788,887 B2 * | 9/2004 | Takeshita et al. | 396/6 |
| 6,811,492 B1 | 11/2004 | Arakawa et al. | |
| D503,697 S | 4/2005 | Kim | |
| D513,505 S | 1/2006 | Lee | |
| 7,110,666 B2 | 9/2006 | Abe et al. | |
| D540,769 S | 4/2007 | Lee et al. | |
| 7,221,330 B2 | 5/2007 | Finke-Anlauff | |
| 7,471,890 B2 | 12/2008 | Lee et al. | |
| 7,606,483 B2 * | 10/2009 | Kurosawa | 396/299 |
| 7,761,002 B2 * | 7/2010 | Akagane | 396/213 |
| 7,876,377 B2 * | 1/2011 | Wang et al. | 348/373 |
| 7,884,970 B2 | 2/2011 | Hiroyasu et al. | |
| 2001/0005454 A1 | 6/2001 | Nishino et al. | |
| 2001/0008412 A1 | 7/2001 | Ando et al. | |
| 2003/0220145 A1 | 11/2003 | Erickson et al. | |
| 2004/0012702 A1 | 1/2004 | Ishige | |
| 2004/0075620 A1 | 4/2004 | Tanaka et al. | |
| 2004/0145675 A1 | 7/2004 | Kitada | |
| 2004/0174430 A1 | 9/2004 | Sawahara et al. | |
| 2004/0204064 A1 | 10/2004 | Ikeda et al. | |
| 2005/0134718 A1 | 6/2005 | Honda | |
| 2005/0153765 A1 | 7/2005 | Shoostine | |
| 2005/0215296 A1 | 9/2005 | Fujihara et al. | |
| 2005/0270396 A1 | 12/2005 | Miyashita et al. | |
| 2006/0044396 A1 | 3/2006 | Miyashita et al. | |
| 2006/0098112 A1 | 5/2006 | Kelly | |
| 2006/0100021 A1 | 5/2006 | Yoshino et al. | |
| 2006/0101354 A1 | 5/2006 | Hashimoto et al. | |
| 2006/0140620 A1 | 6/2006 | Fujii | |
| 2006/0183505 A1 | 8/2006 | Willrich | |
| 2006/0205438 A1 | 9/2006 | Jung | |
| 2006/0214924 A1 | 9/2006 | Kawamoto et al. | |
| 2006/0215753 A1 | 9/2006 | Lee et al. | |
| 2007/0057866 A1 | 3/2007 | Lee et al. | |
| 2007/0091194 A1 | 4/2007 | Kwak | |
| 2007/0115350 A1 | 5/2007 | Currivan et al. | |
| 2007/0117636 A1 | 5/2007 | Takahashi et al. | |
| 2007/0126877 A1 | 6/2007 | Yang | |
| 2007/0164975 A1 | 7/2007 | Lim et al. | |
| 2007/0178952 A1 | 8/2007 | Ehara et al. | |
| 2007/0182663 A1 | 8/2007 | Biech | |
| 2007/0191078 A1 | 8/2007 | Kim | |
| 2007/0249389 A1 | 10/2007 | Hotta | |
| 2007/0280668 A1 | 12/2007 | Kubo et al. | |
| 2008/0070624 A1 | 3/2008 | Hamamura et al. | |
| 2008/0174570 A1 | 7/2008 | Jobs et al. | |
| 2008/0239133 A1 | 10/2008 | Cazier et al. | |

FOREIGN PATENT DOCUMENTS

| | | | |
|---|---|---|---|
| JP | 03182732 A * | 8/1991 | |
| JP | 04-156791 | 5/1992 | |
| JP | 06-276478 | 9/1994 | |
| JP | 09-247634 | 9/1997 | |
| JP | 10-336496 | 12/1998 | |
| JP | 11160776 A * | 6/1999 | |
| JP | 2000-050117 | 2/2000 | |
| JP | 2000066285 A * | 3/2000 | |
| JP | 2000-253113 | 9/2000 | |
| JP | 2001-142564 | 5/2001 | |
| JP | 2002-94629 | 3/2002 | |
| JP | 2002-125176 | 4/2002 | |
| JP | 2002-374434 | 12/2002 | |
| JP | 2003-274247 | 9/2003 | |
| JP | 2003-333149 | 11/2003 | |
| JP | 2004-004309 A | 1/2004 | |
| JP | 2004053699 A * | 2/2004 | |
| JP | 2004-120290 | 4/2004 | |
| JP | 2004-120727 | 4/2004 | |
| JP | 2004-274304 | 9/2004 | |
| JP | 2004-274777 | 9/2004 | |
| JP | 2004-282604 | 10/2004 | |
| JP | 2004-320091 | 11/2004 | |
| JP | 2005-101779 | 4/2005 | |
| JP | 2005-184060 | 7/2005 | |
| JP | 2005-260879 | 9/2005 | |
| JP | 2005-535244 | 11/2005 | |
| JP | 2006-074764 | 3/2006 | |
| JP | 2006-191490 | 7/2006 | |
| JP | 2006-287288 | 10/2006 | |
| JP | 2006-311224 | 11/2006 | |
| JP | 2007-028229 | 2/2007 | |
| JP | 2007-82223 | 3/2007 | |
| JP | 2007-195830 | 8/2007 | |
| JP | 2007-201727 | 8/2007 | |
| KR | 10-2006-0099197 | 9/2006 | |
| WO | 2006/098414 | 9/2006 | |

OTHER PUBLICATIONS

Office Action dated Apr. 12, 2011 issued in U.S. Appl. 12/219,633.

Notice of Reasons for Rejection issued Jun. 18, 2008 in corresponding Japanese Application No. 2008-119641.

Explanation of Circumstances Concerning Accelerated Examination issued in corresponding Japanese Application No. 2008-119641.

Chotto Shoto Edit Software Manual, Sony Computer Entertainment, Oct. 23, 2006, Kenichiro Yasuhara w/ an at least partial English-language translation.

"Future of games seen in latest input devices", ENTERBRAIN Inc., Weekly Famitsu, Jul. 16, 2004, vol. 19.

Notice of Reasons for Rejection issued Sep. 1, 2008 in corresponding Japanese Application No. 2008-186102.

May 28, 2012, Notice of Reasons of Rejection for JP Application No. 2008-129222, 1 page.

Office Action (11 pgs.) dated Sep. 11, 2012 issued in related U.S. Appl. No. 12/153,898.

Verizon shows LG VX9800 EV-DO Communicator Mobileburn, Sep. 20, 2005, archived Nov. 25, 2006 by ww.Archive.org, 4 pages.

LG: "KE850 User Manual", LG KE850 Support, retrieved from the Internet, www.lg.com/uk/support-mobile/lg-KE850#, May 1, 2007, 75 pages.

Anonymous: "iPhone(original)", Wikipedia the free encyclopedia, en.wikipedia.org/wiki/IPhone_%28original%29, retrieved from the Internet, on Oct. 18, 2012, 6 pages.

Dec. 17, 2012 Office Action for U.S. Appl. No. 12/149,461, 18 pages.

Nov. 30, 2012 European Search Report for EP08011912.6, 8 pages.

Dec. 7, 2012 Office Action for U.S. Appl. No. 12/219,633, 17 pages.

Jan. 8, 2013 European Search Report for EP 08012020.7, 9 pages.

Jan. 8, 2013 European Search Report for EP 08015039.4, 9 pages.

Jan. 8, 2013 European Search Report for EP 08012909.1, 8 pages.

Office Action dated Jul. 22, 2011 issued in U.S. Appl. No. 12/153,898.

Oryl, Michael, "Verizon shows LG VX9800 EV-DO Communicator" Mobileburn, Sep. 20, 2005, Archived Nov. 25, 2006 by www.Archive.org accessed Jul. 18, 2011, http://web.archive.org/web/20061125160046/http://www.mobileburn.com/review.jsp?Page=2&Id=1656.

Office Action dated Jun. 27, 2011 issued in U.S. Appl. No. 12/149,461.

Office Action dated Apr. 12, 2011 issued in U.S. Appl. No. 12/219,633.

Notice of Allowance dated Jul. 20, 2010 issued in U.S. Appl. No. 12/426,615.

Office Action dated Mar. 10, 2010 issued in U.S. Appl. No. 12/153,898.

Notice of Reasons for Rejection issued Jun. 18, 2008 in corresponding Japanese Applicaiton No. 2008-119641.

Explanation of Circumstances Concerning Accelerated Examination issued in corresponding Japanese Applicaion No. 2008-119641, May 2008.

Notice of Reasons for Rejection issued Jun. 18, 2008 in corresponding Japanese Application No. 2008-109032.

(56) References Cited

OTHER PUBLICATIONS

Explanation of Circumstances Concerning Accelerated Examination issued in corresponding Japanese Application No. 2008-109032.
Chotto Shoto Edit Software Manual, Sony Computer Entertainment, Oct. 23, 2006, Kenichiro Yasuhara w/ an at lease partial English-language translation.
"Future of games seen in latest input devices", ENTERBRAIN, Inc., Weekley Famitsu, Jul. 16, 2004, vol. 19.
Foma (R) N900i User Manual Application section NTT DoCoMO Apr. 2004, third edition, pp. 251-253, with a partial English translation, 7 pages.
Notice of Reasons for Rejection issued Sep. 1, 2008 in corredsponding Japanese Application No. 2008-186102.
Notice of Reasons for Rejection issued Sep. 2, 2008 in corresponding Japanese Application No. 2008-109032.
Notice of Rejection issued Oct. 1, 2008 in corresponding Japanese Application No. 2008-109032.
U.S. Appl. No. 12/149,461, filed May 1, 2008, Imaging Apparatus.
U.S. Appl. No. 12/153,898, filed May 27, 2008, Imaging Apparatus.
U.S. Appl. No. 12/219,633, filed Jul. 24, 2008, Hand-Held Imaging Apparatus and Storage Medium Storing Program.
U.S. Appl. No. 13/451,958, filed Apr. 20, 2012, Imaging Apparatus.
May 6, 2013 Office Action for U.S. Appl. No. 12/153,898, 30 pages.
Office Action (23 pgs.) dated Oct. 18, 2013 issued in co-pending U.S. Appl. No. 13/954,459.
Office Action (23 pgs.) dated Oct. 23, 2013 issued in co-pending U.S. Appl. No. 13/954,470.

* cited by examiner

IMAGING APPARATUS

CROSS REFERENCE TO RELATED APPLICATION

This is a divisional application of U.S. application Ser. No. 12/149,920, filed on May 9, 2008 which claims priority to Japanese Patent Application No. 2007-222472, filed Aug. 29, 2007 and Japanese Patent Application No. 2008-119641, filed on May 1, 2008, the disclosures of each of which are incorporated herein by reference.

TECHNICAL FIELD

The exemplary embodiments disclosed herein relate to an imaging apparatus, and more particularly to an imaging apparatus which is held and used by a user when taking an image.

BACKGROUND AND SUMMARY

Conventionally, there exists an imaging apparatus which is a foldable hand-held apparatus, such as a mobile phone, and the like, which is provided with a camera to have an imaging function. For example, Patent Document 1 (Japanese Laid-Open Patent Publication No. 2003-333149) discloses a foldable mobile phone having a camera. The mobile phone includes two foldable housings, and the camera is provided in an outer surface of an upper first housing (which is a surface located on the outside of the mobile phone when the mobile phone is folded). As a shutter button for performing a photographing instruction (an instruction to store data of an image taken by the camera), a first shutter button is provided on an inner surface of a lower second housing (which is a surface located on the inside of the mobile phone when the mobile phone is folded), and a second shutter button is provided on the outer surface of the first housing. When photographing is performed while the mobile phone is opened, a user performs a photographing instruction using the first shutter button.

In the mobile phone disclosed in the Patent Document 1, when the user performs photographing, an operation manner in which the user presses the shutter button with a thumb while holding the lower second housing with one hand is assumed. In other words, the user presses the first shutter button with the thumb while contacting the inner surface of the second housing with a thumb and an outer surface of the second housing with the other fingers (so as to sandwich the second housing between the thumb and the other fingers). In such an operation manner, since the thumb has to be separated from the second housing when pressing the first shutter button, the second housing cannot be firmly held. Thus, it is hard to press the first shutter button, and there is a fear that hand movement occurs when the first shutter button is pressed. As described above, the conventional foldable imaging apparatus has a problem that it is hard to perform a photographing operation of pressing the shutter button.

Therefore, feature of certain exemplary embodiments is to provide an imaging apparatus which is capable of improving operability of a photographing operation.

Certain exemplary embodiments have the following aspects to attain the object mentioned above. It is noted that reference characters and supplementary explanations in parentheses in this section are merely provided to facilitate the understanding of the exemplary embodiments and are not intended to be limiting in any way.

A first aspect is a foldable imaging apparatus comprising: a first imaging section; a first housing (a lower housing 11); a second housing (an upper housing 21); and a connection section (axial portions 11A and 21A). The connection section foldably connects the first housing to the second housing. Further, the imaging apparatus comprises at least one photographing button (buttons 14H and 14G) for performing an instruction to record an image taken by the first imaging section. The at least one photographing button is provided on a side surface of the first housing in a case where an inner surface of the first housing when folded is referred to as a front surface, which side surface is on a side on which the second housing is located when the first housing and the second housing are opened.

In a second aspect, the first imaging section may be provided in an outer surface of the second housing when folded.

In a third aspect, the first imaging section may be located in the outer surface of the second housing and on a side more distant from the connection section than a center of the outer surface of the second housing in an up-down direction. It is noted that, here, the first housing and the second housing are connected to each other one above the other, and a direction in which the first housing and the second housing are connected to each other is referred to as an up-down direction. Further, a direction of an axis by which the first housing and the second housing are connected to each other is referred to as a left-right direction. For example, when the first housing has a horizontally long shape, a longitudinal direction of the first housing may be referred to as a left-right direction.

In a fourth aspect, as the at least one photographing button, first and second buttons may be provided on left and right ends of the side surface, respectively.

In a fifth aspect, the imaging apparatus may further comprise a second imaging section (an inner camera 23). The second imaging section is provided substantially at a center of an apparatus main surface (an operation surface), which is formed by the inner surface of the first housing and an inner surface of the second housing when the imaging apparatus is opened, in a left-right direction.

In a sixth aspect, the imaging apparatus may further comprise a plurality of operation buttons (buttons 14A to 14F). The plurality of operation buttons are provided on the inner surface of the first housing and on a right side and a left side of the second imaging section.

In a seventh aspect, the imaging apparatus may further comprise a display section (a lower LCD 12) and a plurality of operation buttons (the buttons 14A to 14F). The display section has a display screen which is provided substantially at a center of the inner surface of the first housing in a left-right direction. The plurality of operation buttons are provided on the inner surface of the first housing and on a left side and a right side of the display screen.

In an eighth aspect, the imaging apparatus may further comprise a display section (the lower LCD 12), a coordinate input section (a touch panel 13), and a control section (a CPU 31). The display section has a display screen which is provided in the inner surface of the first housing. The coordinate input section is an input device operable to input coordinates on the display screen. The control section displays a predetermined image on the display screen, and records an image taken by the first imaging section when an input by the coordinate input section is performed in an area of the predetermined image.

In a ninth aspect, the control section may display the predetermined image so as to be located substantially at a center of the first housing in a left-right direction.

In a tenth aspect, the first housing may have a length in a left-right direction which is equal to or larger than 100 mm and which is equal to or smaller than 150 mm, and a length in an up-down direction which is equal to or larger than 60 mm and which is equal to or smaller than 90 mm.

According to the first aspect, by providing the photographing button on the side surface of the first housing on a side where the first housing is connected to the second housing, a user can press the photographing button with an index finger while holding the first housing by contacting the inner surface of the first housing with a thumb and an outer surface of the first housing with a middle finger, and the like (see FIGS. 6 and 7). According to this, since the user can press the photographing button while firmly holding the first housing, the button is easy to press when a photographing operation is performed, and hand movement is unlikely to occur. Thus, according to the first aspect, operability of the photographing operation with respect to the foldable imaging apparatus can be improved.

Further, according to the first aspect, since the photographing button is provided on the side surface of the first housing, it is possible to perform the photographing operation even in a state where the imaging apparatus is placed on the outer surface of the first housing. It is noted that since the imaging section is provided in the second housing, the user can freely change a photographing direction even in a state where the imaging apparatus is placed.

According to the second aspect, since the first imaging section is provided in the second housing, the photographing direction can be changed by changing an angle of the second housing with respect to the first housing. Further, since the first imaging section is provided in the outer surface of the second housing, an image can be taken in a direction which is the same as a view line direction of the user.

Since the user presses the photographing button provide on the side surface of the first housing with an index finger as described above, there is a fear that the index finger is located within an imaging range of the first imaging section depending on a position of the first imaging section. However, according to the third aspect, since the first imaging section is located on a side distant from the connection portion with the first housing, the index finger can be prevented from being located within the imaging range of the first imaging section.

According to the fourth aspect, since the photographing buttons are provided on the left and right ends of the side surface, respectively, the user can easily press either photographing button even when holding the imaging apparatus with either a right hand or a left hand. Thus, according to the fourth aspect, the user can easily perform the photographing operation regardless of handedness.

According to the fifth aspect, since the second imaging section is provided on the apparatus main surface, an image is taken in a direction toward the user by the second imaging section. Further, since the second imaging section is provided substantially at the center of the apparatus main surface in the left-right direction, the user can easily adjust the imaging apparatus at an appropriate position in the left-right direction, for example, when taking an image of the user, or the like.

According to the sixth aspect, by providing the operation buttons on the inner surface of the first housing, the user can hold the imaging apparatus while contacting the operation buttons with thumbs. Since the operation buttons are provided outward of the second imaging section (in the left-right direction), the thumbs of the user contact the operation buttons at positions outward of the second imaging section. Thus, according to the sixth aspect, a possibility that the thumbs are located within an imaging range of the second imaging section can be lowered (naturally without particularly making the user aware of this).

According to the seventh aspect, by providing the operation buttons on the inner surface of the first housing, the user can hold the imaging apparatus while contacting the operation buttons with thumbs. Here, since the operation buttons are provided on the left and right sides of the display section, the thumbs of the user contact the operation buttons at positions outward of the display section. Thus, according to the seventh aspect, the thumbs are prevented from disturbing a display by locating the thumbs on the display screen of the display section (naturally without particularly making the user aware of this).

According to the eighth aspect, the user is able to perform a photographing operation by the coordinate input section provided on the inner surface of the first housing. According to this, the user can easily perform a photographing operation even when the imaging apparatus is placed on the outer surface of the first housing. Thus, by making it possible to perform a photographing operation using the coordinate input section, it is unnecessary to operate the photographing button with an index finger, and the photographing operation can be easily performed in various holding manners (e.g. in a holding manner in which the second housing is down).

According to the ninth aspect, since the predetermined image to be touched when the user performs a photographing operation is displayed substantially at the center of the first housing, the user can easily perform an operation even when performing an operation with respect to the touch panel with either a right hand or a left hand. Thus, according to the ninth aspect, even when performing a photographing operation in a state where the imaging apparatus is placed on the outer surface of the first housing, the user can easily perform the photographing operation regardless of handedness.

According to the tenth aspect, by making a length of the first housing an appropriate length, such as making the length of the first housing in the left-right direction equal to or larger than 100 mm and equal to or smaller than 150 mm, and making the length of the first housing in the up-down direction equal to or larger than 60 mm and equal to or smaller than 90 mm, the imaging apparatus can have a shape which is easy to hold when held with either one hand or both hands. In other words, according to the tenth aspect, the imaging apparatus does not become hard to hold with one hand by having a shape which is too long in the left-right direction, and does not become hard to hold with both hands by having a shape which is too short in the left-right direction. Further, since the first housing has such a length in the up-down direction that the first housing fits into a palm, it is easy for the user to hold the imaging apparatus when holding the imaging apparatus with either one hand or both hands.

These and other features, aspects and advantages of the exemplary embodiments will become more apparent from the following detailed description when taken in conjunction with the accompanying drawings.

DETAILED DESCRIPTION (Configuration of Imaging Apparatus)

Figure 1:
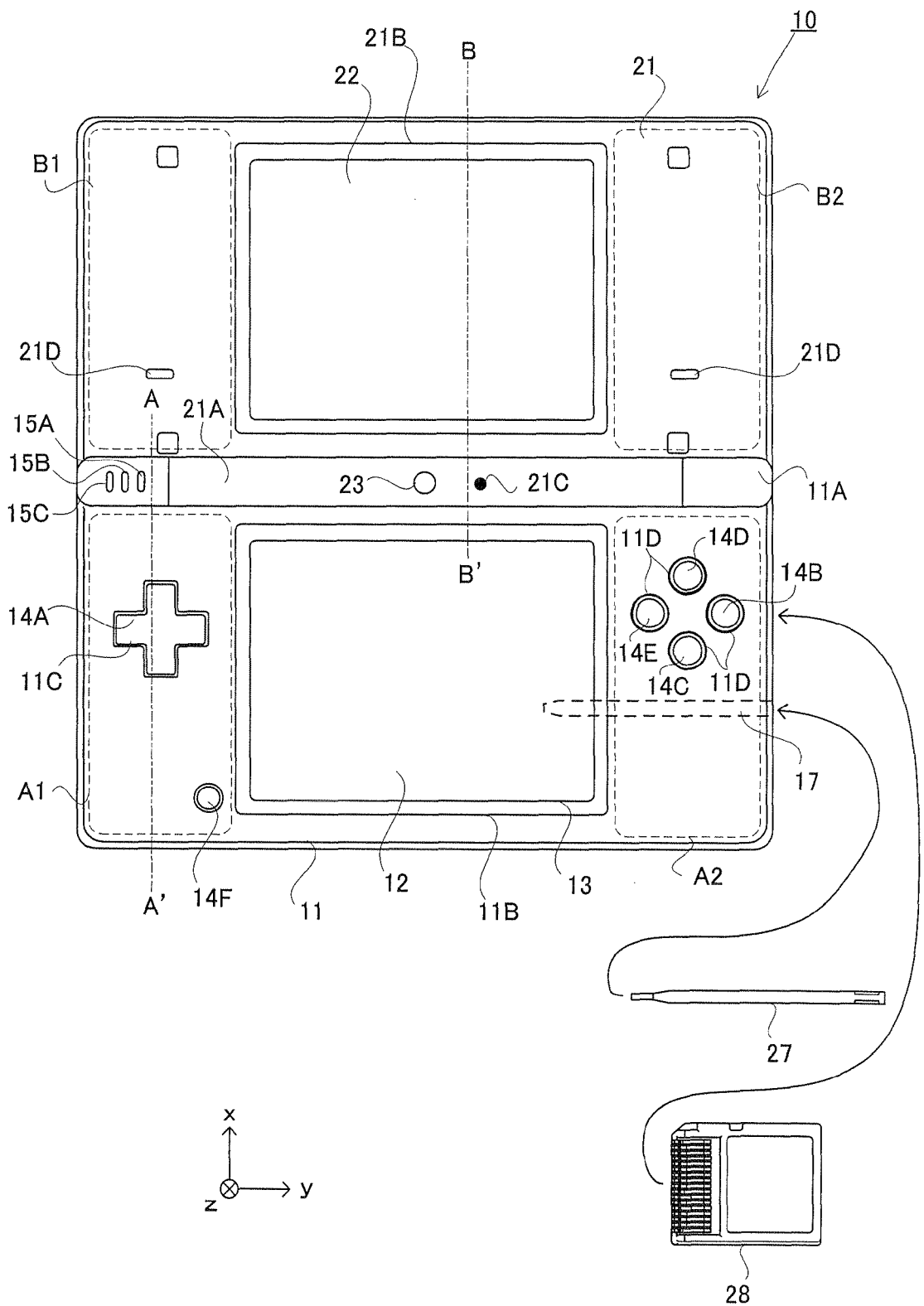
FIG. 1 is an external plan view of an imaging apparatus 10.
Figure 2:
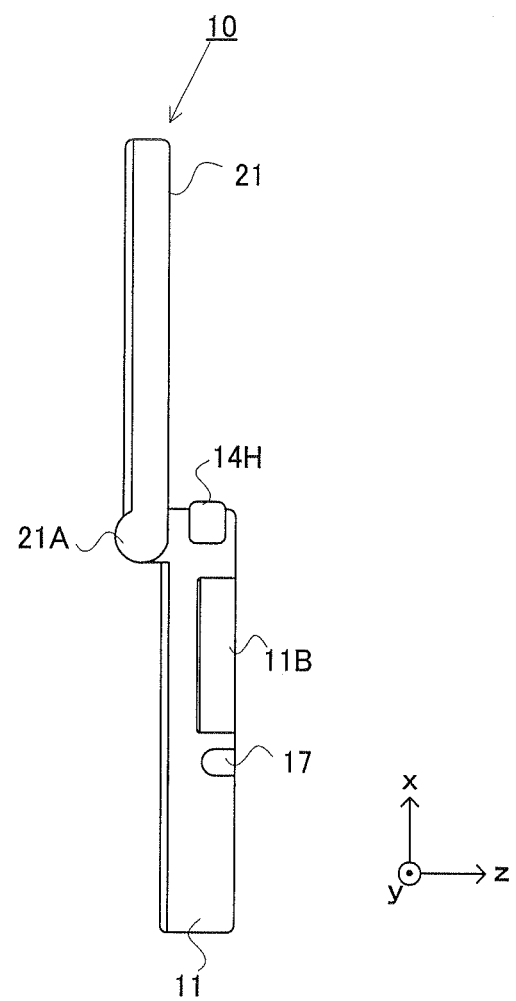
FIG. 2 is an external plan view of the imaging apparatus 10.
Figure 3:
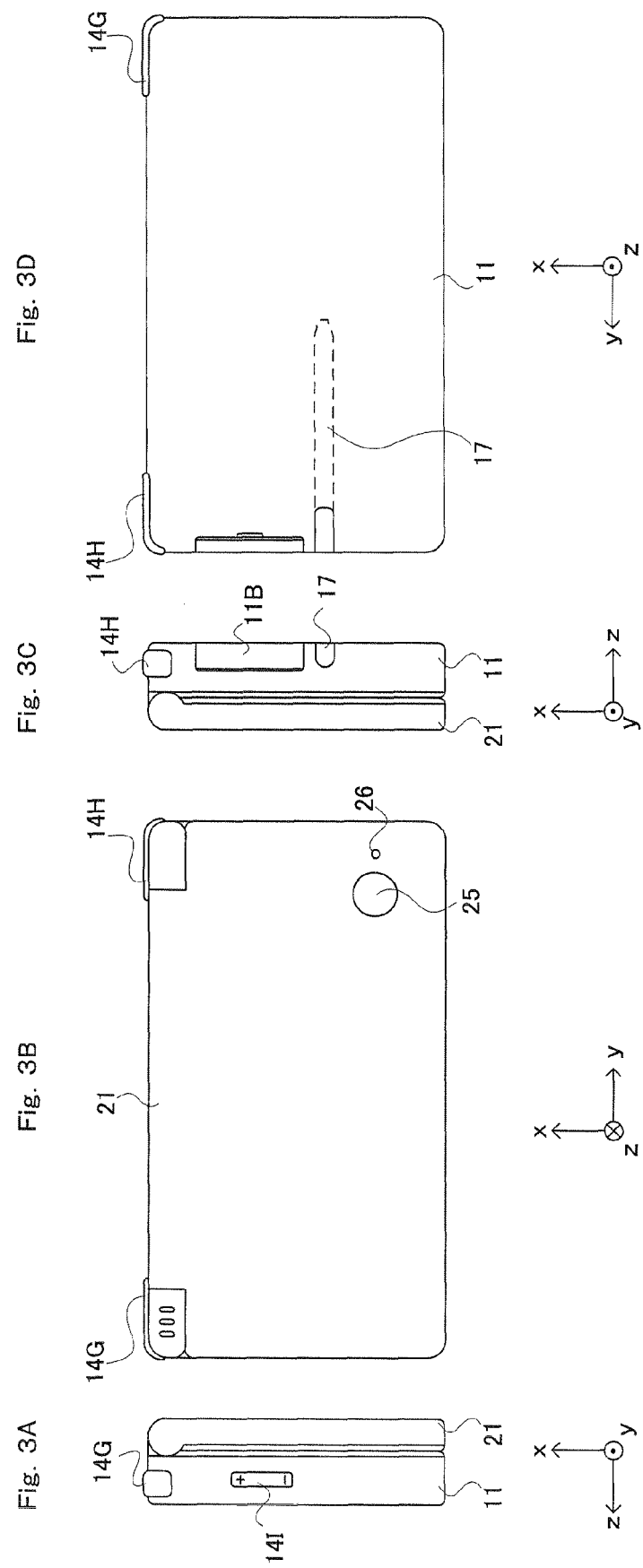
FIGS. 3A, 3B, 3C, and 3D are external plan views of the imaging apparatus 10.

The following will describe an imaging apparatus according to an exemplary embodiment. FIGS. 1 to 3 are external plan views of the imaging apparatus 10. The imaging apparatus 10 is a foldable imaging apparatus, FIGS. 1 and 2 show the imaging apparatus 10 in an opened state, and FIGS. 3A to 3D show the imaging apparatus 10 in a closed state. More specifically, FIG. 1 is a front view of the imaging apparatus 10 in the opened state, and FIG. 2 is a side view of the imaging apparatus in the opened state. The imaging apparatus 10 takes an image with a camera, displays the taken image on a screen, and records data of the taken image (may record data of the taken image in a nonvolatile memory or a volatile memory, or may record data of a still image or a moving image). The imaging apparatus 10 includes two display devices (LCDs 12 and 22) and two cameras (cameras 23 and 25).

Figure 15:
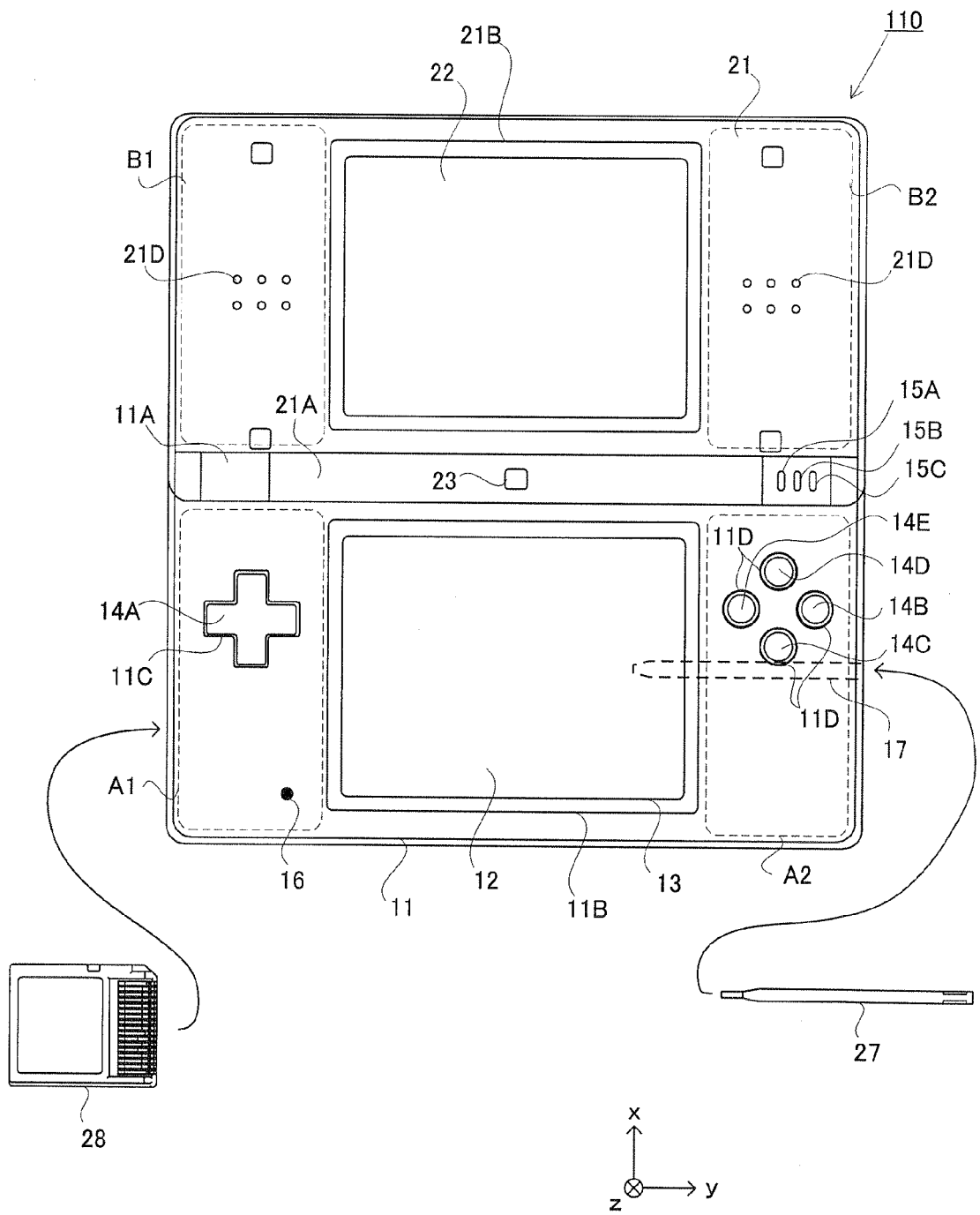
FIG. 15 is an external plan view of an imaging apparatus according to a modified example.
Figure 16:
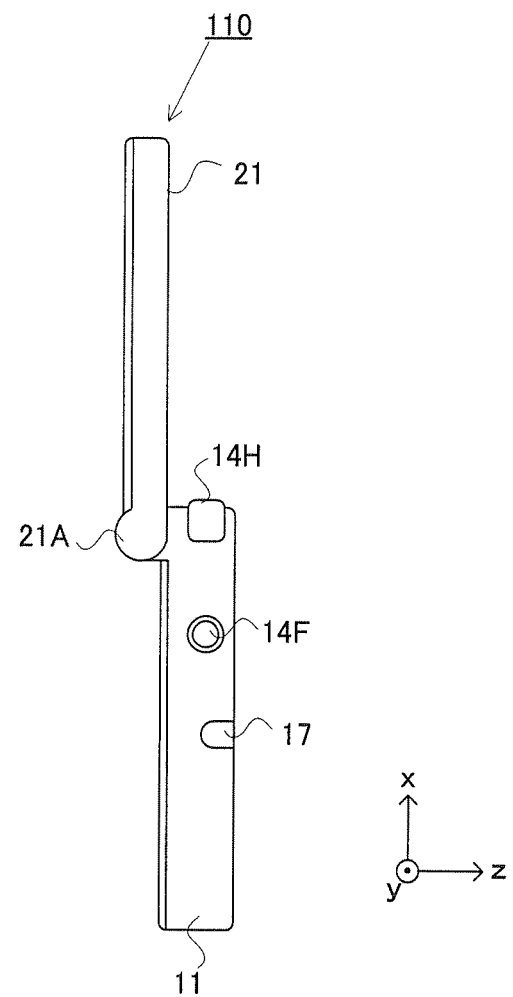
FIG. 16 is an external plan view of the imaging apparatus according to the modified example.
Figure 17:
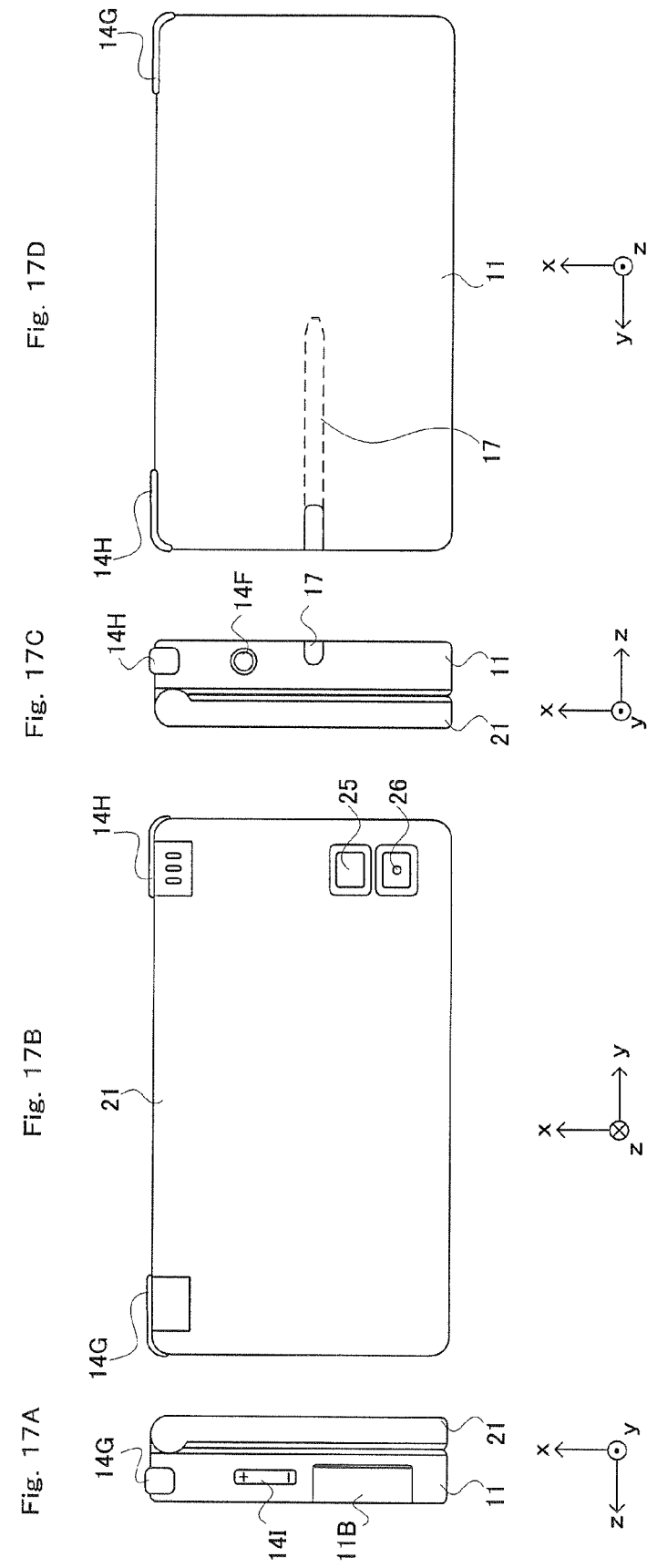
FIGS. 17A, 17B, 17C, and 17D are external plain views of the imaging apparatus according to the modified example.

FIGS. 15 to 17 are external plan views of an imaging apparatus according to a modified example of the exemplary embodiment. FIG. 15 is a front view of the imaging apparatus 10 in an opened state, FIG. 16 is a side view of the imaging apparatus in the opened state, and FIGS. 17A to 17D show the imaging apparatus 10 in a closed state. In FIGS. 15 to 17, the same components as those in FIGS. 1 to 3 are designated by the same reference characters, and the detailed description thereof will be omitted. The imaging apparatus 110 shown in FIGS. 15 to 17 is an imaging apparatus obtained by changing positions, numbers, shapes, and the like, of some components of the imaging apparatus 10 according to the exemplary embodiment, and basic functions thereof is the same as that of the imaging apparatus 10.

The following will describe an external configuration of the imaging apparatus 10 with reference to FIGS. 1 to 5 and FIGS. 15 to 17. The imaging apparatus 10 is small enough in size to be capable of being held with both hands or one hand in the opened state. For example, the imaging apparatus 10 can be 50 to 100 mm long (in x direction in the drawings), and 100 to 200 mm wide (in y direction in the drawings) with a thickness of 10 to 40 mm (in z direction in the drawings) in the closed state, and can be 100 to 200 mm long in the opened state. More preferably, the imaging apparatus 10 can be 60 to 90 mm long, and 100 to 150 mm wide with a thickness of 15 to 30 mm in the closed state, and can be 120 to 160 mm long in the opened state. Further preferably, the imaging apparatus 10 can be 70 to 80 mm long, and 100 to 150 mm wide with a thickness of 15 to 25 mm in the closed state, and can be 135 to 155 mm long in the opened state. It is noted that it is preferable that the thickness of a lower housing 11 be larger than that of an upper housing 21. Further, the length of the imaging apparatus 10 may be substantially the same as the width of the imaging apparatus 10. It is noted that it is preferable that a dimension of the lower housing 11 in a lateral direction be a dimension such that a second joint of an index finger is located adjacent to an upper corner of the lower housing 11 when a lower corner of the lower housing 11 is supported by a center of a palm.

As shown in FIGS. 1 to 3, the imaging apparatus 10 includes two housings, namely, the lower housing 11 and the upper housing 21. The lower housing 11 and the upper housing 21 are connected to each other so as to be capable of being opened or closed (foldable). In the exemplary embodiment, the housings 11 and 21 each have a horizontally long shape (namely, a dimension of each housing in the lateral direction is longer than that in a longitudinal direction), and typically have a rectangular shape. Further, the housings 11 and 21 each have a plate-like shape (namely, a length in a thickness direction is shorter than those in the longitudinal and lateral directions. Further, the upper housing 21 and the lower housing 11 each have a thin plate-like shape. It is preferable that a thickness of the upper housing 21 be smaller than that of the lower housing 11. The lower housing 11 and the upper housing are pivotably connected to each other at long sides thereof.

Figure 4:
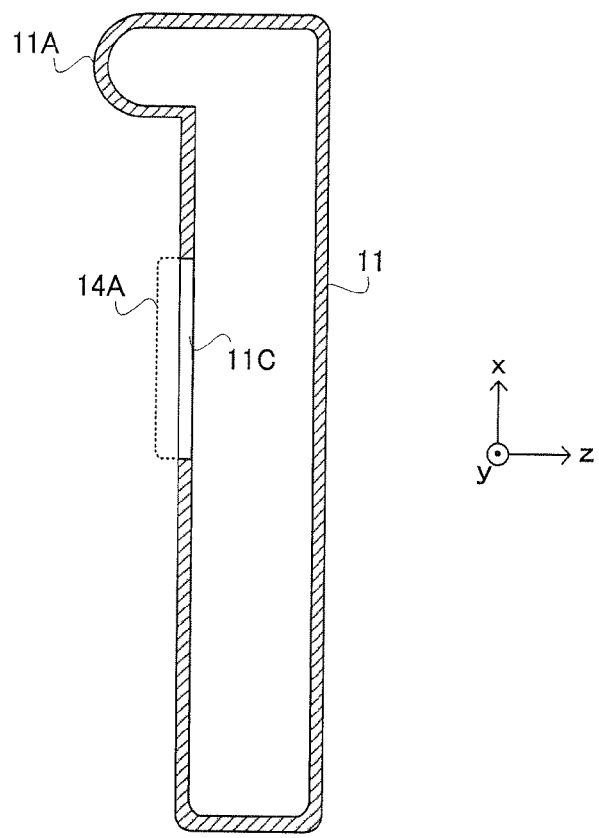
FIG. 4 is a cross-sectional view of a lower housing shown in FIG. 1 which is taken along the line A-A'.
Figure 5:
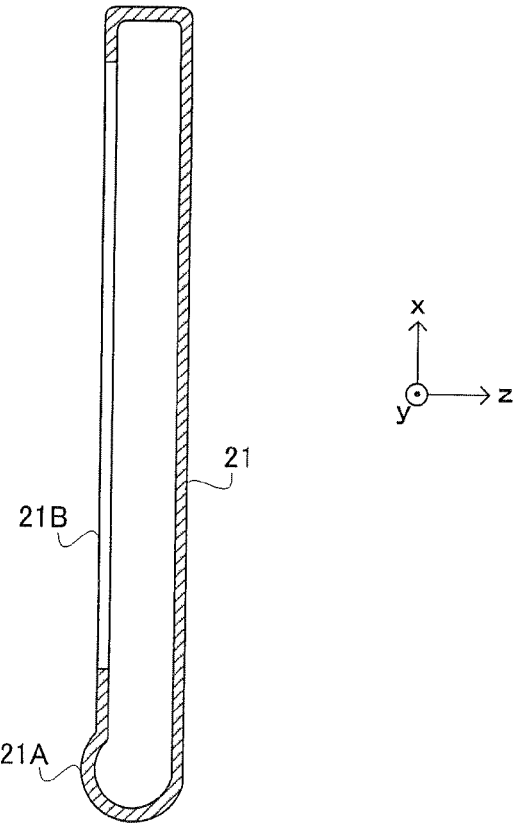
FIG. 5 is a cross-sectional view of an upper housing shown in FIG. 1 which is taken along the line B-B'.

FIG. 4 is a cross-sectional view of the lower housing shown in FIG. 1 which is taken along the line A-A', and FIG. 5 is a cross-sectional view of the upper housing shown in FIG. 1 which is taken along the line B-B'. As shown in FIG. 4, on an inner surface of the lower housing 11 (which is a surface located on the inside of the imaging apparatus 10 in the closed state), axial portions 11A are provided so as to project in the vertical direction (the axial portions 11A are structurally integral with the lower housing). The axial portions 11A are provided at both ends in a left-right direction (in the y direction in the drawings) (see FIG. 1). As shown in FIG. 15, each of the axial portions 11A may be provided in a position inward of the respective end in the left-right direction. Further, as shown in FIG. 5, on a lower surface of the upper housing 21 (which is a side surface on an x-axis negative side in the drawings), an axial portion 21A is provided so as to project in the vertical direction with respect to the lower surface of the upper housing 21 (the axial portion 21A is structurally integral with the upper housing). The axial portion 21A is provided so as to project in the vertical direction with respect to the lower surface as well as so as to project in the vertical direction with respect to an inner surface of the upper housing 21 (which is a surface located on the inside of the imaging apparatus 10 in the closed state). The axial portion 21A is provided at a center of the lower end of the upper housing 21 in the left-right direction (see FIG. 1). The axial portions 11A and the axial portion 21A are pivotally connected to each other by a hinge provided therein, thereby forming a projection portion. As constructed above, the projection portion projects with respect to the inner surface of each of the housings 11 and 21 (see FIG. 2). Since the axial portions 11A are provided so as to project with respect to the inner surface of the lower housing 11 and the axial portion 21A is provided so as to project downwardly of the upper housing 21, a step is formed between an outer surface of the lower housing 11 (which is a surface located on the outside of the imaging apparatus 10 in the closed state) and an outer surface of the upper housing 21 by the thickness of the lower housing 11 in a state where the two housings 11 and 21 are connected to each other (see FIG. 2).

As described above, the upper housing 21 is pivotally supported by a part of an upper portion of the lower housing 11. Thus, the imaging apparatus 10 is capable of being in the closed state (which is a state where an angle between the lower housing 11 and the upper housing 21 is about 0 degree (see FIG. 2)) or in the opened state (which is a state where the angle between the lower housing 11 and the upper housing 21 is about 180 degrees (see FIG. 1)). A user usually uses the imaging apparatus 10 in the opened state, and keeps the imaging apparatus 10 in the closed state when not using the imaging apparatus 10. Further, in the exemplary embodiment, in addition to the closed state and the opened state, the imaging apparatus 10 can maintain the angle between the lower housing 11 and the upper housing 21 at any angle ranging between the closed state and the opened state by frictional force generated at the hinge, and the like. In other words, the upper housing 21 can be stationary at any angle with respect to the lower housing 11. Alternatively, the hinge may have a mechanism to temporarily fix the upper housing 21 and the lower housing 11 at a predetermined angle smaller than 180 degrees with click feeling. In other words, the upper housing 21 and the lower housing 11 may be temporarily fixed in the opened state at the predetermined angle smaller than 180 degrees with click feeling. Specifically, for example, the predetermined angle ranges from 150 to 175 degrees, and is 160 degrees in the exemplary embodiment. In the exemplary embodiment, the housings 11 and 21 are capable of being opened up to an angle of 180 degrees. However, in an alternative exemplary embodiment, the housings 11 and 21 may be capable of being opened only up to the predetermined angle or up to an angle of 180 degrees or more.

A configuration provided in the lower housing 11 will be described. As shown in FIG. 1, the imaging apparatus 10 includes the lower LCD (Liquid Crystal Display) 12. The lower LCD 12 has a horizontally long shape, and is located such that a long side direction thereof corresponds to a long side direction of the lower housing 11. The lower LCD 12 is accommodated in the lower housing 11. The lower LCD 12 is provided in the inner surface of the lower housing 11. Thus, by making the imaging apparatus 10 in the closed state when the imaging apparatus 10 is not used, a screen of the lower LCD 12 can be prevented from getting dirty and being damaged. It is noted that although an LCD is used as a display device in the exemplary embodiment, any other display devices such as a display device using an EL (Electro Luminescence) may be used. In addition, the imaging apparatus 10 can use a display device of any resolution. Although details will be described later, the lower LCD 12 is used for displaying an image taken by a camera 23 or 25 in real time.

The inner surface of the lower housing 11 is formed to be substantially planar. At a center of the inner surface of the lower housing 11, an opening 11B is formed for exposing the lower LCD 12. On the left side of the opening 11B (on a y-axis negative side in the drawings), an opening 11C is formed, and on the right side of the opening 11B, openings 11D are formed. The openings 11B and 11c are for exposing key tops (upper surfaces of buttons 14A to 14E). The screen of the lower LCD 12 accommodated in the lower housing 11 is exposed from the opening 11B, and the key tops are exposed from the openings 11C and 11D. Thus, in the inner surface of the lower housing 11, non-screen areas (dotted line areas A1 and A2 shown in FIG. 1, more specifically, areas for arranging the buttons 14A to 14D; button arrangement areas) are provided on both sides of the opening 11B provided at the center of the inner surface of the lower housing 11 for the lower LCD 12. Each of the button arrangement areas is designed to have a dimension of at least 15 mm or more (preferably 20 mm or more, more preferably 30 to 40 mm) in the lateral direction (in the y direction in the drawings).

In the lower housing 11, the buttons 14A to 14I and a touch panel 13 are provided as input devices. As shown in FIG. 1, among the buttons 14A to 14I, the direction input button 14A, the button 14B, the button 14C, the button 14D, the button 14E, and the power button 14F are provided on the inner surface of the lower housing 11. The direction input button 14A is used, for example, for a selection operation, and the buttons 14B to 14E are used, for example, for a determination operation, a cancellation operation, and the like. The power button 14F is used for turning on or off the power of the imaging apparatus 10. The direction input button 14A and the power button 14F are provided on one side (the left side in FIG. 1) of the lower LCD 12 provided in the vicinity of the center of the lower housing 11, and the buttons 14B to 14E are provided on the other side (on the right side in FIG. 1) of the lower LCD 12. It is noted that as shown in FIGS. 16 and 17C, the power button 14F may be provided on a right side surface of the lower housing 11. The direction input button 14A has a cross shape, and is about 20 mm in length and width. The direction input button 14A is provided such that a center thereof is located in a position distant from the left end of the lower housing 11 by about 20 mm and from the lower end of the lower housing 11 by about 40 mm. The power button 14F has a circular shape, and is provided such that a center thereof is located in a position distant from the left end of the lower housing 11 by about 25 mm and from the lower end of the lower housing 11 by about 10 mm. Each of the buttons 14B to 14E has a circular shape and a radius of 5 mm. The button 14B is provided such that a center thereof is located in a position distant from the right end of the lower housing 11 by about 10 mm and from the lower end of the lower housing 11 by about 40 mm. The button 14C is provided such that a center thereof is located in a position distant from the right end of the lower housing 11 by about 20 mm and from the lower end of the lower housing 11 by about 40 mm. The button 14D is provided such that a center thereof is located in a position distant from the right end of the lower housing 11 by about 20 mm and from the lower end of the lower housing 11 by about 50 mm. The button 14E is provided such that a center thereof is located in a position distant from the right end of the lower housing 11 by about 25 mm and from the lower end of the lower housing 11 by about 45 mm. The direction input button 14A and the buttons 14B to 14E are used for performing various operations (described later) with respect to the imaging apparatus 10.

FIG. 3A is a left side view of the imaging apparatus 10 in the closed state, FIG. 3B is a front view of the imaging apparatus 10, FIG. 3C is a right side view of the imaging apparatus 10, and FIG. 3D is a back view of the imaging apparatus 10. As shown in FIGS. 3A and 3C, the volume button 14I is provided on a left side surface of the lower housing 11. The volume button 14I is used for adjusting volume of a speaker of the imaging apparatus 10. As shown in FIG. 3D, the button 14H is provided at a right end of an upper surface of the lower housing 11. The button 14G is provided at a left end of the upper surface of the lower housing 11. It is noted that it is preferable that the button 14H extend at its right end to the right end of the lower housing 11, but may not extend so. In the former case, it is preferable that design be made such that a right side surface of the button 14H is substantially flush with the right side surface of the lower housing 11. Further, the button 14H extends at its back surface to a back surface of the lower housing 11, but may not extend so. In the former case, it is preferable that design be made such that the back surface of the button 14H is substantially flush with the back surface of the lower housing 11. It is noted that much the same is true on the button 14G.

More specifically, the buttons 14H and 14G have a length of about 20 mm in the left-right direction, and a width (a length in the thickness direction, namely, a length in the z direction in the drawings) of about 10 mm. Each of the buttons 14G and 14H is used, for example, for performing a photographing instruction operation (a shutter operation) with respect to the imaging apparatus 10. Both the buttons 14G and 14H may function as a shutter button. In this case, a right-handed user can use the button 14H, and a left-handed user can use the button 14G. Thus, the imaging apparatus 10 is user-friendly for either user. It is noted that the imaging apparatus 10 may set the buttons 14G and 14H to be constantly valid as shutter buttons. Or, the imaging apparatus 10 may make settings for right-handedness or left-handedness (the user is caused to perform an input for the settings by a menu program, and the like, and set data is stored), only the button 14H is set to be valid in the case of the settings for the right-handedness, and only the button 14G is set to be valid in the case of the settings for the left-handedness. In an alternative exemplary embodiment, a button for performing a photographing instruction operation may be provided only on the upper surface of the lower housing 11.

As shown in FIG. 1, the imaging apparatus 10 further includes the touch panel 13 as another input device in addition to the above buttons. The touch panel 13 is mounted on the screen of the lower LCD 12. In the exemplary embodiment, the touch panel 13 is a resistive film type touch panel. However, the touch panel is not limited to the resistive film type, but any press-type touch panel may be used. The touch panel 13 used in the exemplary embodiment has the same resolution (detection accuracy) as that of the lower LCD 12. However, the resolution of the touch panel 13 and the lower LCD 12 may not necessarily be the same as each other. In the right side surface of the lower housing 11, an insertion opening 17 (indicated by a dotted line in FIGS. 1 and 3D) is provided. The insertion opening is capable of accommodating a touch pen 27 used for performing an operation with respect to the touch panel 13. An input with respect to the touch panel 13 is usually performed using the touch pen 27. However, in addition to the touch pen 27, a finger of the user can be used for operating the touch panel 13.

As shown in FIG. 3A, a cover 11B is provided on the right side surface of the lower housing 11 so as to be capable of being opened or closed. Inside the cover 11B, a connector (not shown) is provided for electrically connecting the imaging apparatus 10 to a memory card 28. The memory card 28 is detachably mounted to the connector. The memory card 28 is used, for example, for storing data of an image taken by the imaging apparatus 10. Alternatively, as shown in FIG. 17A, the connector and the cover 11B may be provided on the left side surface of the lower housing 11.

As shown in FIG. 1, three LEDs 15A to 15C are mounted to the left side axial portion 11A of the lower housing 11 (the LEDs 15A to 15C may be mounted to the right side axial portion 11A as shown in FIG. 15). The imaging apparatus 10 is capable of performing wireless communication with another apparatus, and the first LED 15A is lit up while wireless communication is established. The second LED 15B is lit up while the imaging apparatus 10 is charged. The third LED 15C is lit up while the power of the imaging apparatus 10 is ON. Thus, by the three LEDs 15A to 15C, a state of communication establishment of the imaging apparatus 10, a state of charge of the imaging apparatus 10, and a state of ON/OFF of the power of the imaging apparatus 10 can be notified to the user.

Figure 6:
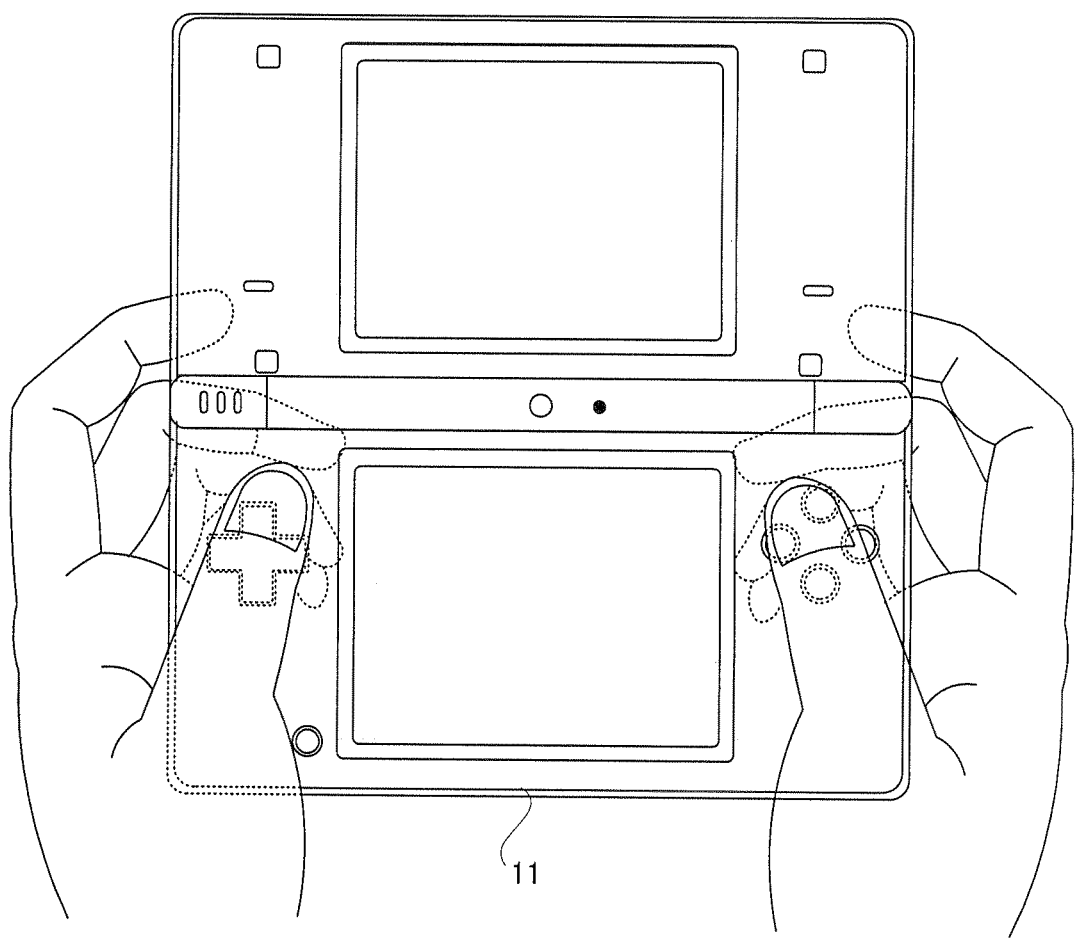
FIG. 6 is a view showing a state where a user holds the imaging apparatus 10 with both hands.
Figure 7:
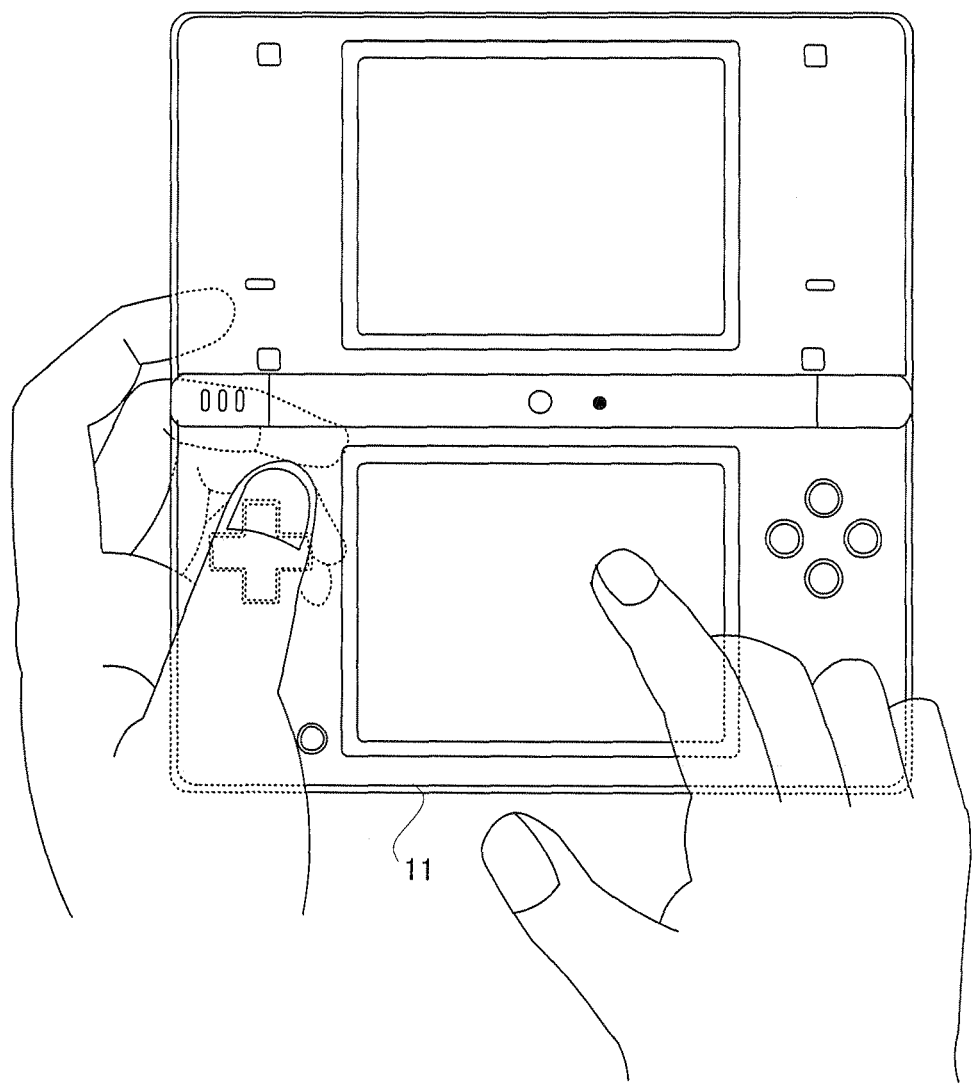
FIG. 7 is a view showing a state where the user holds the imaging apparatus 10 with one hand.

As described above, in the lower housing 11, the input devices (the touch panel 13 and the buttons 14A to 14I) are provided for performing an operation input with respect to the imaging apparatus 10. Thus, the user can hold the lower housing 11 and perform an operation with respect to the imaging apparatus 10 when using the imaging apparatus 10. FIG. 6 is a view showing a state where the user holds the imaging apparatus 10 with both hands. As shown in FIG. 6, the user holds the side surfaces and an outer surface (a surface opposite to the inner surface) of the lower housing 11 with palms, middle fingers, ring fingers, and little fingers of both hands in a state where the LCDs 12 and 22 face the user. By so holding, the user can perform an operation with respect to the buttons 14A to 14E with thumbs and perform an operation with respect to the buttons 14G and 14H with index fingers while holding the lower housing 11. In the exemplary embodiment, the lower housing 11 is formed in the horizontally long shape, and provided with the buttons on both sides of the lower LCD 12. Thus, the imaging apparatus can be easy to hold and easy to operate. Further, as described above, the button arrangement areas (A1 and A2 shown in FIG. 1) are provided so as to have a dimension of at least 15 mm in the lateral direction thereof. Thus, thumbs can be prevented from being located on the lower LCD 12 when holding the lower housing 11. FIG. 7 is a view showing a state where the user holds the imaging apparatus 10 with one hand. When performing an input with respect to the touch panel 13, as shown in FIG. 7, one hand holding the lower housing 11 is released from lower housing 11, and the lower housing 11 is held only with the other hand, thereby performing an input with respect to the touch panel 13 with the one hand. In this case, a thumb holding the lower housing 11 can be prevented from being located on the lower LCD 12. Further, while holding the lower housing 11 with both hands, it is possible to perform an input with respect to the touch panel 13 with a thumb of one hand (a thumb of a right hand if the user is right-handed). In this case, a thumb of the other hand holding the lower housing 11 (a thumb of a left hand if the user is right-handed) can be prevented from being located on the touch panel 13.

Meanwhile, a configuration for taking an image (a camera) and a configuration for displaying the taken image (a display device) are provided in the upper housing 21. The following will describe a configuration provided in the upper housing 21.

As shown in FIG. 1, the imaging apparatus 10 includes the upper LCD 22. The upper LCD 22 is accommodated in the upper housing 21. The upper LCD 22 has a horizontally long shape, and is located such that a long side direction thereof corresponds to a long side direction of the upper housing 21. The upper LCD 22 is provided in the inner surface of the upper housing 21 (which is the surface located on the inside of the imaging apparatus 10 in the closed state). Thus, by making the imaging apparatus 10 in the closed state when the imaging apparatus 10 is not used, a screen of the upper LCD 22 can be prevented from getting dirty and being damaged. Similarly as the lower LCD 12, a display device of another type having any resolution may be used instead of the upper LCD 22. Although details will be described later, the upper LCD 22 mainly displays thereon an image concerning an imaging operation, such as an image for explaining a manner of an operation to the user, and the like. In an alternative exemplary embodiment, a touch panel may be provided on the upper LCD 22.

The imaging apparatus 10 includes the two cameras 23 and 25. Each of the cameras 23 and 25 is accommodated in the upper housing 21. As shown in FIG. 1, the inner camera 23 is mounted in the inner surface of the upper housing 21. On the other hand, as shown in FIG. 3B, the outer camera 25 is mounted in a surface opposite to the surface in which the inner camera 23 is mounted, namely, in the outer surface of the upper housing 21 (which is a surface located on the outside of the imaging apparatus 10 in the closed state). Thus, the inner camera 23 is capable of taking an image in a direction in which the inner surface of the upper housing 21 faces, and the outer camera 25 is capable of taking an image in a direction opposite to an imaging direction of the inner camera 23, namely, in a direction in which the outer surface of the upper housing 21 faces. As described above, in the exemplary embodiment, the two cameras 23 and 25 are provided such that the imaging directions thereof are opposite to each other. As a result, the user can take images in two different directions without changing a manner of holding the imaging apparatus 10. For example, the user can take an image of a view seen from the imaging apparatus 10 toward the user with the inner camera 23 as well as an image of a view seen from the imaging apparatus 10 in a direction opposite to the user with the outer camera 25.

Further, the inner camera 23 is mounted at a center of the axial portion 21A formed at the center of the lower end of the upper housing 21. In other words, the inner camera 23 is mounted at a center of a portion where the two housings 11 and 21 are connected to each other. Thus, when the imaging apparatus 10 is in the opened state, the inner camera 23 is located between the two LCDs 12 and 22 (see FIG. 1). In other words, the inner camera 23 is located in the vicinity of a center of the imaging apparatus 10. It is noted that the "center of the imaging apparatus 10" means a center of an operation surface of the imaging apparatus 10 (which includes the inner surfaces of the housings 11 and 21 in the opened state). Further, it may be meant that the inner camera 23 is located in the vicinity of a center of the LCDs 12 and 22 in the lateral direction. In the exemplary embodiment, since the axial portion 21A is integral with the upper housing 21 and the inner camera 23 is fixedly disposed in the axial portion 21A, the imaging direction of the inner camera 23 is changed in accordance with opening and closing of the upper housing 21. Thus, change in the imaging direction can be achieved without providing an additional mechanism for changing the imaging direction of the camera. Further, the inner camera 23 faces the lower housing 11 by closing the upper housing 21. Thus, the inner camera 23 can be protected automatically by making the imaging apparatus 10 in the closed state.

As described above, in the exemplary embodiment, the inner camera 23 is provided in the axial portion 21A so as to be located in the vicinity of an center of the operation surface of the imaging apparatus 10. However, in an alternative exemplary embodiment, the inner camera 23 may be provided in a position other than the axial portions of the lower housing 11 and the upper housing 21. When the inner camera 23 is provided substantially at the center of the operation surface of the imaging apparatus 10 in the left-right direction, the user can easily adjust the imaging apparatus 10 at an appropriate position at least in the left-right direction, for example, in taking an image of the user.

Here, for example, the case where the inner camera 23 is located at an end of the operation surface of the imaging apparatus 10 (e.g. at an upper end of the inner surface of the upper housing 21) is considered. When operating a hand-held apparatus such as the imaging apparatus 10, the user usually holds the imaging apparatus 10 so as to face the imaging apparatus 10 for clearly viewing the screen. However, in the case where the inner camera 23 is located at an end of the imaging apparatus 10, the user cannot be located within an imaging range of the inner camera 23 when holding the imaging apparatus 10 in a usual holding orientation (in an orientation in which the user faces the imaging apparatus 10). For example, in the case where the inner camera 23 is located at an upper end of the operation surface, the imaging range is slightly above the user when the user holds the imaging apparatus 10 in the usual holding orientation, and hence a face of the user cannot be located within the imaging range. Thus, in the case where the inner camera 23 is located at the end of the operation surface of the imaging apparatus 10, the imaging apparatus 10 has to be moved from the usual holding orientation such that the user is located within the imaging range. However, when an image of a view seen from the imaging apparatus 10 toward the user is taken, since a view line direction of the user is opposite to the imaging direction of the camera and the imaging apparatus 10 has to be held in an orientation different from the usual holding orientation, it is hard for the user to locate the imaging apparatus 10 such that the user is located within the imaging range.

On the other hand, in the exemplary embodiment, when the imaging apparatus 10 is in the opened state, the inner camera 23 is located in the vicinity of the center of the imaging apparatus 10. Thus, when taking an image of the user with the inner camera 23, the user only has to hold the imaging apparatus 10 in an orientation in which the user faces the imaging apparatus 10. In other words, when holding the imaging apparatus in the usual holding orientation, the user is located in the vicinity of a center of the imaging range, and hence it is easy to locate the user fall within the imaging range. As described above, by locating the inner camera 23 in a position in the vicinity of the center of the imaging apparatus 10 as viewed from the user, it becomes easy to take an image of the user such that the user is located within the imaging range.

As shown in FIG. 3B, the outer camera 25 is located in an upper portion of the upper housing 21 (in a portion distant from the lower housing 11 (more distant from the lower housing 11 than a center of the upper housing 21)) when the imaging apparatus 10 is in the opened state. This is because since the user holds the lower housing 11 when using the imaging apparatus 10, if the outer camera 25 is located adjacent to the lower housing 11, there is a fear that a hand of the user is located within an imaging range of the outer camera 25. In the exemplary embodiment, the outer camera 25 is provided such that a center thereof is located in a position distant from a right end of the upper housing 21 by about 20 mm and from an upper end of the upper housing 21 by about 20 mm when the imaging apparatus 10 is in the opened state. It is noted that since the outer camera 25 is not for taking an image of the user holding the imaging apparatus 10, there is a low need for providing the outer camera 25 at the center of the imaging apparatus 10. Further, since the user basically holds the lower housing 11, if the lower housing 11 has an appropriate thickness, the lower housing 11 is easy to hold. On the other hand, since portability is high if the imaging apparatus 10 is small in thickness when folded, it is preferable that the upper housing 21 be thin as much as possible. Thus, in the exemplary embodiment, the upper LCD 22 is located at the center of the upper housing 21 in view of visibility, and the outer camera 25 is located in the upper portion of the upper housing 21 avoiding a position where the upper LCD 22 is arranged. Thus, since the upper LCD 22 does not overlap with the outer camera 25, the upper housing 21 can be made thinner. Further, since the user basically holds the lower housing 11, by providing the outer camera 25 in the upper housing 21, a finger holding the lower housing 11 can be prevented from being located within the imaging range of the outer camera 25.

As shown in FIG. 3B, a microphone (a microphone 42 shown in FIG. 10) as a voice input device is accommodated in the upper housing 11. More specifically, the microphone is mounted to the axial portion 21A of the upper housing 21. In the exemplary embodiment, the microphone is mounted adjacent to the inner camera 23 (on a side in the y axis direction in the drawing), and more specifically, mounted in a position laterally distant from the inner camera 23 by 10 mm (on a side in a y-axis positive direction in the drawing). In the axial portion 21A, a microphone hole 21C is provided in a position corresponding to the microphone (on a side of the inner camera 23) to allow the microphone to detect sound outside the imaging apparatus 10. Alternatively, as shown in FIG. 15, the microphone may be accommodated in the lower housing 11. As shown in FIG. 15, the microphone hole 16 is provided in the inner surface of the lower housing 11, more specifically, in a lower left portion of the inner surface of the lower housing 11 (in the button arrangement area A1). The microphone is located in the lower housing 11 and adjacent to the microphone hole 16.

As shown in FIG. 3B, a fourth LED 26 is mounted in the outer surface of the upper housing 21. The fourth LED 26 is mounted adjacent to the outer camera 25 (on a right side of the outer camera 25 in the exemplary embodiment, and above the outer camera 25 in the closed state in the example shown in FIG. 17B). The fourth LED 26 is lit up at a time when photographing is performed with the inner camera 23 or the outer camera 25 (the shutter button is pressed). Further, the fourth LED 26 is lit up while a moving picture is taken by the inner camera 23 or the outer camera 25. By the fourth LED 26, it is notified to an object person whose image is taken that photographing is performed (being performed) by the imaging apparatus 10.

The inner surface of the upper housing 21 is formed to be substantially planar. As shown in FIG. 1, at a center of the inner surface of the upper housing 21, an opening 21B is formed for exposing the upper LCD 22. The screen of the upper LCD 22 accommodated in the upper housing 21 is exposed from the opening 21B. Further, a sound hole 21D is formed on each of sides of the opening 21B. Speakers are accommodated in the upper housing 21 and at the back of the sound holes 21D. The sound holes 21D are holes for releasing sound from the speakers therethrough.

As described above, in the inner surface of the upper housing 21, non-screen areas (dotted line areas B1 and B2 shown in FIG. 1, more specifically, areas for arranging the speakers; speaker arrangement area) are provided on both sides of the opening 21B provided at the center of the inner surface of the upper housing 21 for the upper LCD 22. In the exemplary embodiment, lengths (widths) of the lower housing 11 and the upper housing 21 in the lateral direction thereof (in the y direction in the drawing) are the same as each other. Further, widths of the lower LCD 12 and the upper LCD 22 in the left-right direction are the same as each other, and the lower LCD 12 and the upper LCD 22 are located in the same position in the left-right direction. Thus, the speaker arrangement areas are provided such that positions thereof in the left-right direction correspond to positions of the button arrangement areas in the left-right direction. Similarly as the button arrangement areas, the speaker arrangement areas are designed to have a dimension of at least 15 mm or more (preferably 20 mm or more, more preferably 30 to 40 mm, and 32 mm in the exemplary embodiment) in the lateral direction. In the exemplary embodiment, concerning the left-right direction, the two sound holes 21D are located in the vicinity of centers of the speaker arrangement areas in the left-right direction, respectively. Further, concerning an up-down direction, the sound holes 21D are located in lower portions of the speaker arrangement areas (in portions close to the lower housing 11), respectively. Alternatively, as shown in FIG. 15, the speakers and the sound holes 21D are located slightly higher than in FIG. 1. Further, as shown in FIG. 15, a plurality of sound holes 21D (six in FIG. 15) may be provided for one speaker.

Figure 8:
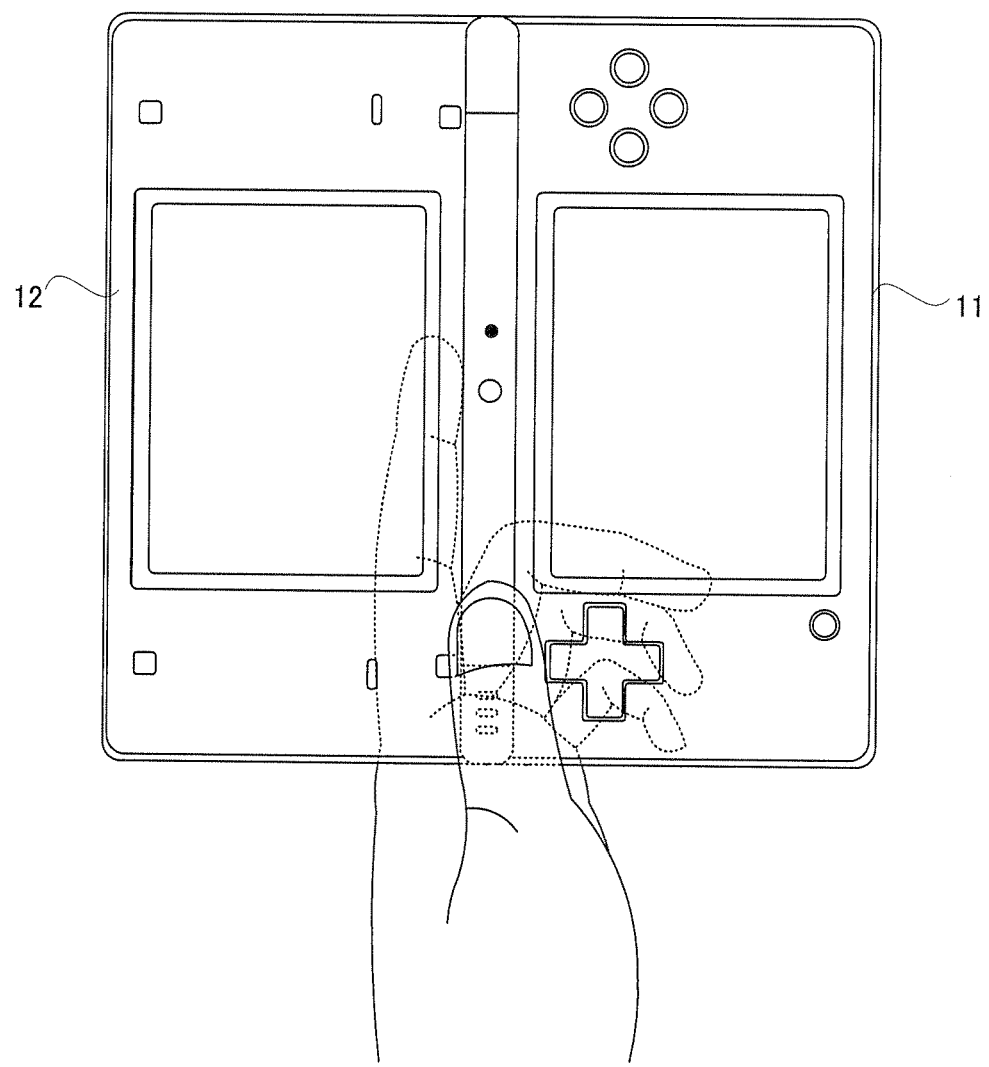
FIG. 8 is a view showing a state where the user holds the imaging apparatus 10 lengthwise.
Figure 9:
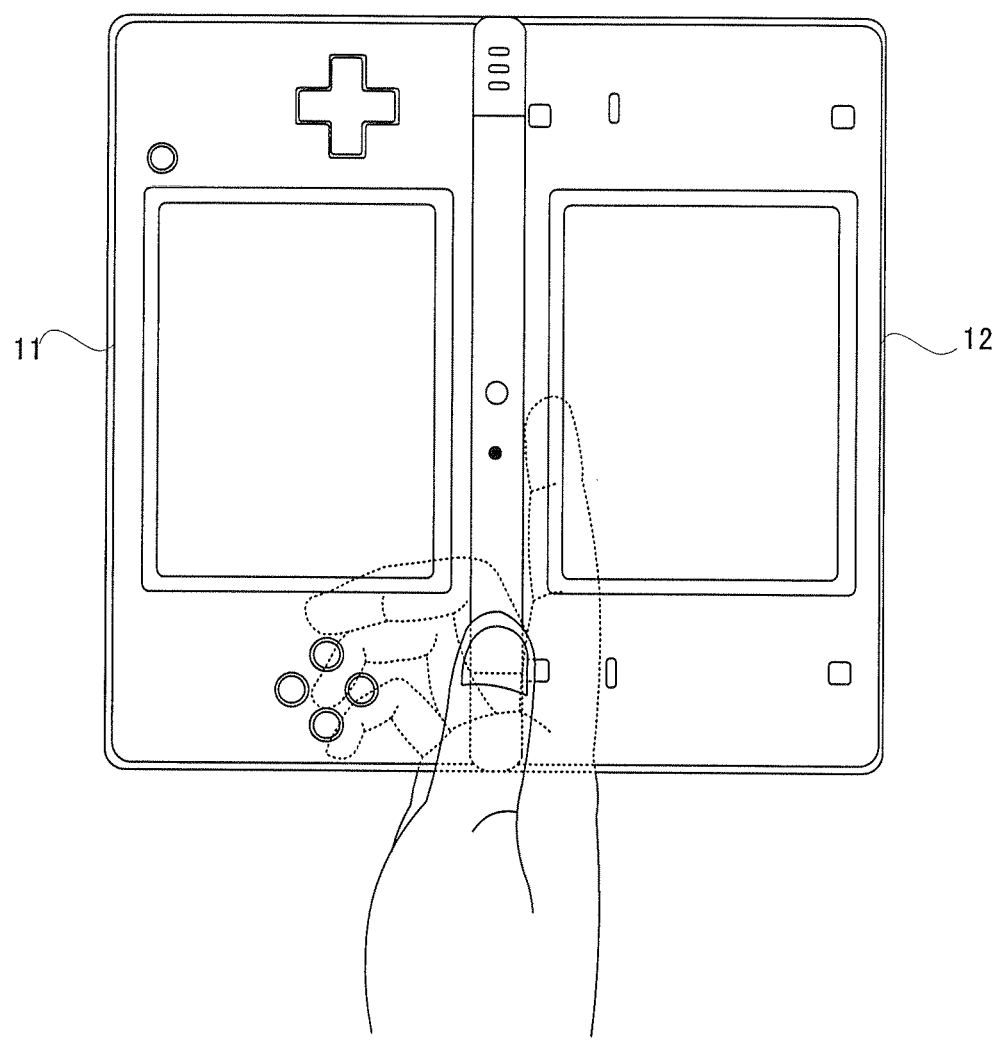
FIG. 9 is a view showing a state where the user holds the imaging apparatus 10 lengthwise.

As described above, in the exemplary embodiment, the non-screen areas are provided in the lower housing 11 and the upper housing 21 in the same position in the left-right direction. Thus, the imaging apparatus 10 has a configuration to be easily held when held sideways as shown in FIG. 5 as well as when held lengthwise (in a state where the imaging apparatus 10 is rotated 90 degrees clockwise or counterclockwise). FIGS. 8 and 9 are views showing a state where the user holds the imaging apparatus 10 lengthwise. FIG. 8 shows a state where the imaging apparatus 10 is held with a left hand, and FIG. 9 shows a state where the imaging apparatus 10 is held with a right hand. A right-handed user may rotate the imaging apparatus 10 90 degrees counterclockwise, and hold the imaging apparatus 10 with a left hand as shown in FIG. 8. A left-handed user may rotate the imaging apparatus 10 90 degrees clockwise, and hold the imaging apparatus 10 with a right hand as shown in FIG. 9. In either case, the user can hold the imaging apparatus 10 while contacting the projection portion (the axial portions 11A and 21A) with a thumb and the upper surface of the lower housing 11 with an index finger. As described above, the step is formed between the outer surface of the lower housing 11 and the outer surface of the upper housing 21 (see FIG. 2), the imaging apparatus 10 can be stably held by contacting the step with the index finger. The shutter button (the button 14G or 14H) can be easily pressed by a dominant hand which is not holding the imaging apparatus 10.

Since the non-screen areas are provided on both sides of the LCDs 12 and 22 as described above, when the imaging apparatus 10 is held lengthwise with either hand, a thumb is not located on the screen. In other words, when held lengthwise, the imaging apparatus 10 is easy to hold, and visibility of the screen and operability of the touch panel are maintained. Further, as shown in FIG. 4, the projection portion projects with respect to the lower housing 11 further than the key tops of the buttons 14A to 14E (the direction input button 14A in FIG. 4). Thus, if a thumb holding the imaging apparatus 10 lengthwise is located above a button, there is a low possibility that the user accidentally presses the button, and an accidental input can be prevented. Further, since the imaging apparatus 10 has a dimension of 100 to 200 mm in length in the opened state, when held lengthwise, the imaging apparatus 10 has an enough width substantially equal to the width of the imaging apparatus 10 when held sideways, and hence is not hard to hold. When the imaging apparatus 10 is held lengthwise, the angle between the housings may be the predetermined angle smaller than 180 degrees. By making the angle between the housings become slightly smaller than 180 degrees, the outer surfaces of the housings 11 and 21 fit into a shape of a hand, and hence it becomes easier to hold the imaging apparatus 10.

As described above, the cameras 23 and 25 which are the configurations for taking an image, and the upper LCD 22 which is display means for displaying the taken image are provided in the upper housing 21. On the other hand, the input devices for performing an operation input with respect to the imaging apparatus 10 (the touch panel 13 and the buttons 14A to 14I) are provided in the lower housing 11. Thus, when using the imaging apparatus 10, the user can hold the lower housing 11 and perform an input with respect to the input device while looking at a taken image (an image taken by the camera) displayed on the upper LCD 22.

The imaging apparatus 10 is suitable for performing photographing in a state where the imaging apparatus 10 is held by the user as well as for performing photographing in a state where the imaging apparatus 10 is placed on a stand, or the like. More specifically, the lower housing 11 is placed on a surface, and the angle between the two housings 11 and 21 is adjusted such that the upper housing 21 is inclined at a desired angle with respect to the lower housing 11. Thus, even when not holding the imaging apparatus 10, the user can perform photographing at an optional angle of the upper housing 21 (the imaging direction of the camera). Since the imaging apparatus 10 includes the two cameras 23 and 25, photographing can be performed in different directions by changing a camera for performing photographing between the inner camera 23 and the outer camera 25 without moving the imaging apparatus 10 placed on the stand. It is noted that when photographing is performed with either camera, the imaging direction can be changed by adjusting the angle between the two housings 11 and 21. It is noted that the imaging apparatus 10 may have a self-timer function in which photographing is performed after a predetermined time period from a time when the shutter button is pressed. When photographing is performed with the self-timer function, the user does not hold the imaging apparatus 10. Thus, adjustment of the imaging direction of the camera to an optional direction as in the exemplary embodiment is particularly convenient. Further, in the exemplary embodiment, the two cameras 23 and 25 for taking images in different directions are provided in the upper housing 21. Thus, even when the imaging apparatus 10 is placed and photographing is performed, both of the cameras 23 and 25 can be used. Further, in the exemplary embodiment, since the lower housing 11 is formed in the horizontally long shape, stability is increased when the imaging apparatus 10 is placed, and the imaging apparatus 10 can be hard to fall down.

Alternatively, the imaging apparatus 10 may change an LCD for displaying a real-time image taking by the camera 23 or 25 between the upper LCD 22 and the lower LCD 12, for example, by a change instruction from the user. In this case, for example, when the imaging apparatus 10 is placed and used on a stand, the change may be made so as to display a real-time image on the lower LCD 12. This is because when the imaging apparatus 10 is placed and used on the stand, since the angle of the upper housing 21 needs to be changed for adjusting the imaging direction of the camera, the user can easily look at a real-time image displayed on the lower LCD 12 of the lower housing 11 whose angle does not need to be changed.

According to the above configuration, the imaging apparatus 10 includes the buttons and the touch panel as input devices. Thus, the imaging apparatus 10 is capable of selecting an appropriate input device as an input device to be used for performing an input operation depending on a type (characteristic) of the input operation. For example, concerning a shutter operation, it is preferable that the user have actual feeling of performing the operation and that the operation have a certain stroke. Thus, the shutter operation may be performed using the button. Further, concerning later-described editing processing, it is preferable that an operation be performed using the touch panel.

In the exemplary embodiment, the imaging apparatus 10 is configured to be foldable by pivotably connecting the lower housing 11 to the upper housing 12. In an alternative exemplary embodiment, the lower housing 11 may be connected to the upper housing 12 by another configuration or in another manner. For example, two plate-like housings may be connected to each other such that one of the housings is slidable or pivotable with respect to the other housing while being in parallel with the other housing. Even by this, similarly as in the above exemplary embodiment, the two housings can be in an opened state or a closed state. Alternatively, in the above exemplary embodiment, the upper housing 21 may be configured such that the axial portion 21A and the other portion thereof are rotatable with respect to each other about an axis in the up-down direction. According to this, by providing only one camera in the upper housing 21, the camera can be easily directed in either the view line direction of the user or a direction opposite to the view line direction.

(Internal Configuration of Imaging Apparatus 10)

Figure 10:
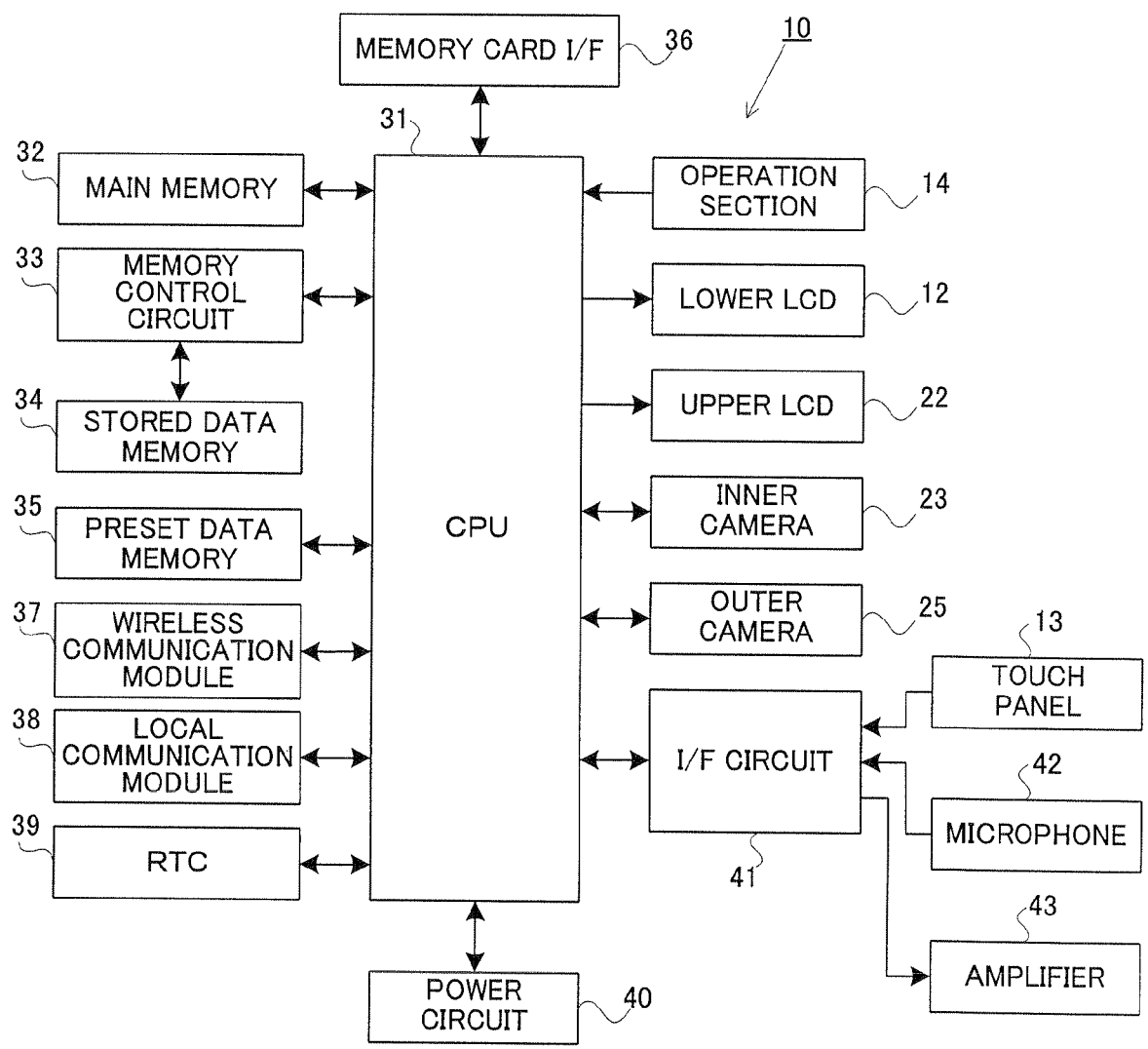
FIG. 10 is a block diagram showing an internal configuration of the imaging apparatus 10.

The following will describe an electrical configuration of the imaging apparatus 10 with reference to FIG. 10. FIG. 10 is a block diagram showing an internal configuration of the imaging apparatus 10. As shown in FIG. 10, the imaging apparatus 10 includes electronic components including a CPU 31, a main memory 32, a memory control circuit 33, a stored data memory 34, a preset data memory 35, a memory card interface (memory card I/F) 36, a wireless communication module 37, a local communication module 38, a real time clock (RTC) 39, a power circuit 40, an interface circuit (I/F circuit) 41, and the like. These electronic components are mounted on an electronic circuit substrate and accommodated in the lower housing 11 (or may be accommodated in the upper housing 21).

Although various electronic circuits and a battery of the imaging apparatus 10 may be accommodated in either the upper housing 21 or the lower housing 11, it is preferable that the imaging apparatus 10 be designed such that a weight of the lower housing 11 is heavier than that of the upper housing 21. More specifically, it is preferable that the weight of the lower housing 11 range from 100 to 200 g and that the weight of the upper housing 21 range from 50 to 100 g. Further, it is more preferable that the weight of the lower housing 11 range from 130 to 150 g and that the weight of the upper housing 21 range from 70 to 90 g. In the exemplary embodiment, the weight of the lower housing 11 is about 150 g, and the weight of the upper housing is about 75 g. Further, it is preferable that concerning a ratio between the weight of the lower housing 11 and the weight of the upper housing 21, (the weight of the lower housing 11):(the weight of the upper housing 21) range from 1.5:1 to 3:1 (more preferably, 2:1). For example, it is preferable that the battery, the circuit substrate on which the CPU is mounted, the card connector, and the like be accommodated in the lower housing 11. Further, it is preferable that minimal components such as an LCD unit (the upper LCD 22, and the like), an imaging unit (the cameras 23 and 25, and the like), a speaker unit, and the like be accommodated in the upper housing 21. By designing the imaging apparatus 10 such that the weight of the lower housing 11 is heavier than that of the upper housing 21, the imaging apparatus 10 becomes hard to fall down when placed on a stand. Further, by making the lower housing 11 held by the user heavier than the upper housing 21, stability is increased when the imaging apparatus 10 is held, and hand movement can be prevented when performing photographing.

The CPU 31 is information processing means for executing a predetermined program. In the exemplary embodiment, the predetermined program is stored in a memory (e.g. the stored data memory 34) within the imaging apparatus 10, and the CPU 31 executes later-described photographing processing (FIG. 11) by executing the predetermined program. It is noted that the program executed by the CPU 31 may be stored in advance in a memory within the imaging apparatus 10, may be obtained from the memory card 28, or may be obtained from another apparatus by means of communication with the other apparatus.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In other words, the main memory 32 stores various data used in the photographing processing, and also stores a program obtained from the outside (the memory card 28, another apparatus, and the like). In the exemplary embodiment, for example, a PSRAM (Pseudo-SRAM) is used as the main memory 32. The stored data memory 34 is storage means for storing the program executed by the CPU 31, data of images taken by the cameras 23 and 25, and the like. The stored data memory 34 is constructed of, for example, a NAND flash memory. The memory control circuit 33 is a circuit for controlling reading of data from the stored data memory 34 or writing of data to the stored data memory 34 in accordance with an instruction from the CPU 31. The preset data memory 35 is storage means for storing data (preset data) of various parameters which are set in advance in the imaging apparatus 10, and the like. A flash memory connected to the CPU 31 via an SPI (Serial Peripheral Interface) bus can be used as the preset data memory 35.

The memory card I/F 36 is connected to the CPU 31. The memory card I/F 36 reads data from the memory card 28 mounted to the connector or writes data to the memory card 28 in accordance with an instruction from the CPU 31. In the exemplary embodiment, data of images taken by the cameras 23 and 25 are written to the memory card 28, and the image data stored in the memory card 28 are read from the memory card 28 to be stored in the stored data memory 34.

The wireless communication module 37 functions to connect to a wireless LAN device by a method conformed to the standard of IEEE802.11.b/g. The local communication module 38 functions to wirelessly communicate with an imaging apparatus of the same type by a predetermined communication method. The wireless communication module 37 and the local communication module 38 are connected to the CPU 31. The CPU 31 is capable of receiving data from and sending data to another apparatus via the Internet by using the wireless communication module 37, and capable of receiving data from and sending data from another imaging apparatus of the same type by using the local communication module 38.

The RTC 39 and the power circuit 40 are connected to the CPU 31. The RTC 39 counts a time, and outputs the time to the CPU 31. The CPU 31 calculates a current time (date) based on the time counted by the RTC 39. The power circuit 40 controls electric power from a power supply (the battery accommodated in the lower housing) of the imaging apparatus 10 to supply the electric power to each electronic component of the imaging apparatus 10.

The imaging apparatus 10 includes the microphone 42 and an amplifier 43. The microphone 42 and the amplifier 43 are connected to the I/F circuit 41. The microphone 42 detects sound, and outputs a sound signal to the I/F circuit 41. The amplifier 43 amplifies the sound signal from the I/F circuit 41, and causes the speaker (not shown) to output the sound signal. The I/F circuit 41 is connected to the CPU 31. The touch panel 13 is connected to the I/F circuit 41. The I/F circuit 41 includes a sound control circuit for controlling the microphone 42 and the amplifier 43 (the speaker) and a touch panel control circuit for controlling the touch panel. The sound control circuit performs A/D conversion or D/A conversion on the sound signal, and converts the sound signal into sound data in a predetermined format. The touch panel control circuit generates touch position data in a predetermined format based on a signal from the touch panel 13, and outputs the touch position data to the CPU 31. The touch position data indicates coordinates of a position on an input surface of the touch panel 13 at which an input is performed. The touch panel control circuit reads a signal from the touch panel 13 and generates touch position data every a predetermined time period. The CPU 31 can recognize a position at which an input is performed with respect to the touch panel 13 by obtaining the touch position data.

An operation section 14 includes the above buttons 14A to 14I, and is connected to the CPU 31. The operation section 14 outputs operation data indicative of an input state with respect to each of the buttons 14A to 14I (whether or not each button is pressed) to the CPU 31. The CPU 31 obtains the operation data from the operation section 14, and executes processing in accordance with an input with respect to the operation section 14.

The cameras 23 and 25 are connected to the CPU 31. Each of the cameras 23 and 25 takes an image in accordance with an instruction from the CPU 31, and outputs data of the taken image to the CPU 31. In the exemplary embodiment, the CPU 31 gives an imaging performing instruction to the camera 23 or 25, and the camera which has received the imaging performing instruction takes an image and sends image data to the CPU 31.

The LCDs 12 and 22 are connected to the CPU 31. Each of the LCDs 12 and 22 displays an image thereon in accordance with an instruction from the CPU 31. In the exemplary embodiment, the CPU 31 causes a taken image obtained from the camera 23 or 25 to be displayed on the upper LCD 22, and an operation screen generated by predetermined processing to be displayed on the lower LCD 12.

Although not shown in the drawings, the imaging apparatus 10 has a vibration function to vibrate itself. The vibration function is used, for example, for giving information to the user (e.g. for notifying the user of error in operation, excess of capacity, and the like). In the exemplary embodiment, since it is assumed that the user holds the lower housing 11 during use, it is preferable that a device for achieving the vibration function (e.g. a vibrator such as a vibration motor, a solenoid, and the like) be accommodated in the lower housing 21. Thus, vibrations can be conveyed to the user holding the imaging apparatus 10 (the lower housing 21).

(Photographing Processing in Imaging Apparatus 10)

Figure 11:
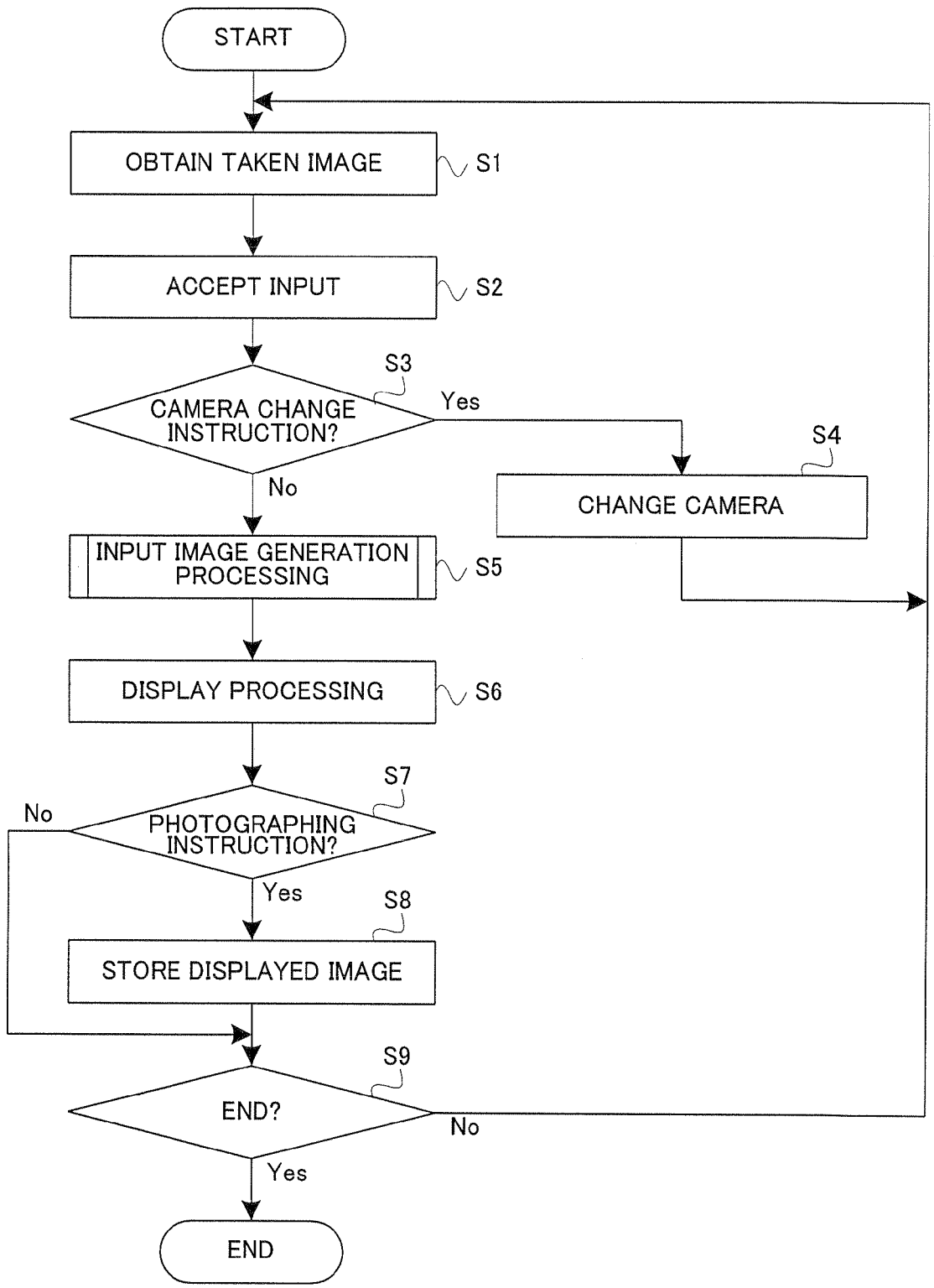
FIG. 11 is a flow chart showing a procedure of photographing processing in the imaging apparatus 10.

The following will describe an operation of the imaging apparatus 10 with reference to FIGS. 11 and 5. FIG. 11 is a flow chart showing a procedure of photographing processing in the imaging apparatus 10. When the power is applied to the imaging apparatus 10 by pressing the power button 14F, the CPU 31 of the imaging apparatus 10 initializes the main memory 32 and the like, and then starts executing a program for executing the photographing processing shown in FIG. 11. It is noted that a processing loop of steps S1 to S9 is executed every a predetermined time period (e.g. every 1/60 sec.).

At the step S1 shown in FIG. 11, the CPU 31 obtains data of an image taken by the inner camera 23 or the outer camera 25. In the exemplary embodiment, an image is taken by either the camera 23 or 25. At the step S1, the CPU 31 obtains image data only from the camera. In the exemplary embodiment, at a time of start of the photographing processing, a camera for taking an image is set to the outer camera 25. Subsequent to the step S1, processing at the step S2 is executed.

Figure 12:
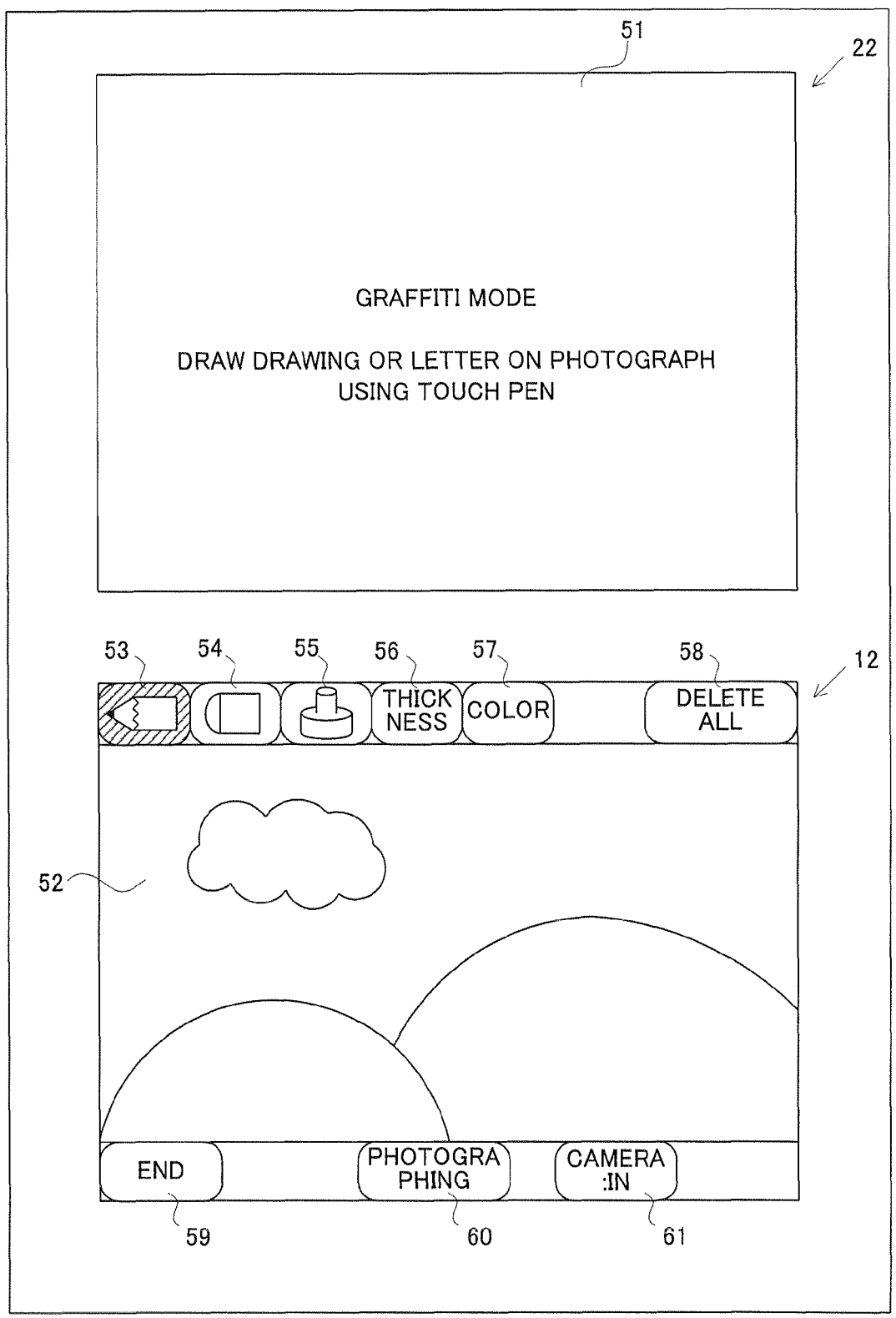
FIG. 12 is a view showing an example of images displayed on LCDs 12 and 22.

The image data obtained from the camera 23 or 25 at the step S1 is displayed on the lower LCD 12. FIG. 12 is a view showing an example of images displayed on the LCDs 12 and 22. FIG. 12 shows an image in the case where there is no image inputted by the user in later-described input image generation processing. As shown in FIG. 12, the CPU 31 causes a real-time image (a taken image) 52 taken by the camera 23 or 25 to be displayed on the lower LCD 12. It is noted that an image 51 for explaining a manner of an operation to the user is displayed on the upper LCD 12. In the exemplary embodiment, the CPU 31 causes various button images 53 to 61 to be displayed on the lower LCD 12 along with the taken image. Each of the button images 53 to 61 is an image for performing an instruction with respect to the imaging apparatus 10 by the user performing a touch input with respect to a position of the image. The following will describe the button images 53 to 61.

The pen mode image 53, the eraser mode image 54, and the seal mode image 55 are images for changing an editing mode. In the exemplary embodiment, three modes, namely, a pen mode, a seal mode, and an eraser mode, are prepared in advance. In the pen mode, an image of an input line inputted with respect to the touch panel 13 can be added to the taken image. In the seal mode, a seal image prepared in advance can be added to the taken image. In the eraser mode, an image added in the pen mode or the seal mode can be deleted. The pen mode image 53 is an image for performing an instruction to change the editing mode to the pen mode. The eraser mode image 54 is an image for performing an instruction to change the editing mode to the eraser mode. The seal mode image 55 is an image for performing an instruction to change the editing mode to the seal mode.

The thickness change image 56 is an image for performing an instruction to change a thickness of a line inputted in the pen mode. The color change image 57 is an image for performing an instruction to change a color of a line inputted in the pen mode. The all deletion image 58 is an image for performing an instruction to delete all images added in the pen mode or the seal mode.

By performing instructions using the button images 53 to 58, the user can input an image on the taken image displayed on the lower LCD 12 (so as to be superimposed on the taken image). Hereinafter, an image inputted by the user is referred to as an "input image". Processing of generating an input image (input image generation processing) will be described in detail later.

The end image 59 is an image for performing an instruction to end the photographing processing. The photographing instruction image 60 is an image for performing a photographing instruction. In the exemplary embodiment, the photographing instruction is an instruction to store an image displayed on the lower LCD 12 (an image obtained by superimposing an input image on an taken image). It is noted that it is preferable that the photographing instruction image 60 be displayed substantially at the center of the lower housing 11 (in the left-right direction) for providing an easy operation when the user operates the photographing instruction image 60 with either a right hand or a left hand. Thus, if the lower LCD 12 is not located substantially at the center of the lower housing 11, it is preferable that the CPU 31 display the photographing instruction image 60 so as to be located substantially at the center of the lower housing 11, not at the center of the lower LCD 12. The camera change image 61 is an image for performing a camera change instruction. The camera change instruction is an instruction to change a camera for taking an image between the inner camera 23 and the outer camera 25.

At the step S2, the CPU 31 accepts an input with respect to each input device. In other words, the CPU 31 obtains operation data from the operation section 14, and obtains touch position data from the touch panel 13. The obtained operation data and touch position data are stored in the main memory 32. Subsequent to the step S2, processing at the step S3 is executed.

At the step S3, the CPU 31 determines whether or not the camera change instruction has been performed. In the exemplary embodiment, the camera change instruction is performed by pressing a predetermined button (e.g. the button 14B, the button 14C, the button 14D, or the button 14E), or by performing an input with respect to the touch panel 13 by touching an area where the camera change image 61 is displayed. Thus, in the determination processing at the step S3, the CPU 31 determines whether or not the predetermined button has been pressed or an input to touch the area where the camera change image 61 is displayed has been performed. The determination at the step S3 can be made by referring to the operation data and the touch position data which are stored in the main memory 32 at the step S2. When a result of the determination at the step S3 is positive, processing at the step S4 is executed. On the other hand, when the result of the determination at the step S3 is negative, processing at the later-described step S5 is executed.

At the step S4, the CPU 31 changes the camera for taking an image. In other words, when the camera for taking an image is the inner camera 23, the CPU 31 changes the camera for taking an image to the outer camera 25. When the camera for taking an image is the outer camera 25, the CPU 31 changes the camera for taking an image to the inner camera 23. More specifically, the CPU 31 gives an instruction to stop an operation to one of the cameras 23 and 25 taking an image, and gives an instruction to perform imaging (an imaging performing instruction) to the other camera. When the processing at the step S4 is executed, at the step S1 executed the next time, data of an image taken by the camera after the change is obtained by the CPU 31, and at the step S6 executed the next time, the image taken by the camera after the change is displayed on the lower LCD 12. Subsequent to the step S4, the processing at the step S1 is executed again.

At the step S5, the CPU 31 executes the input image generation processing. The input image generation processing is processing of generating an input image by an input by the user. The following will describe the input image generation processing in detail with reference to FIGS. 13 and 14.

Figure 13:
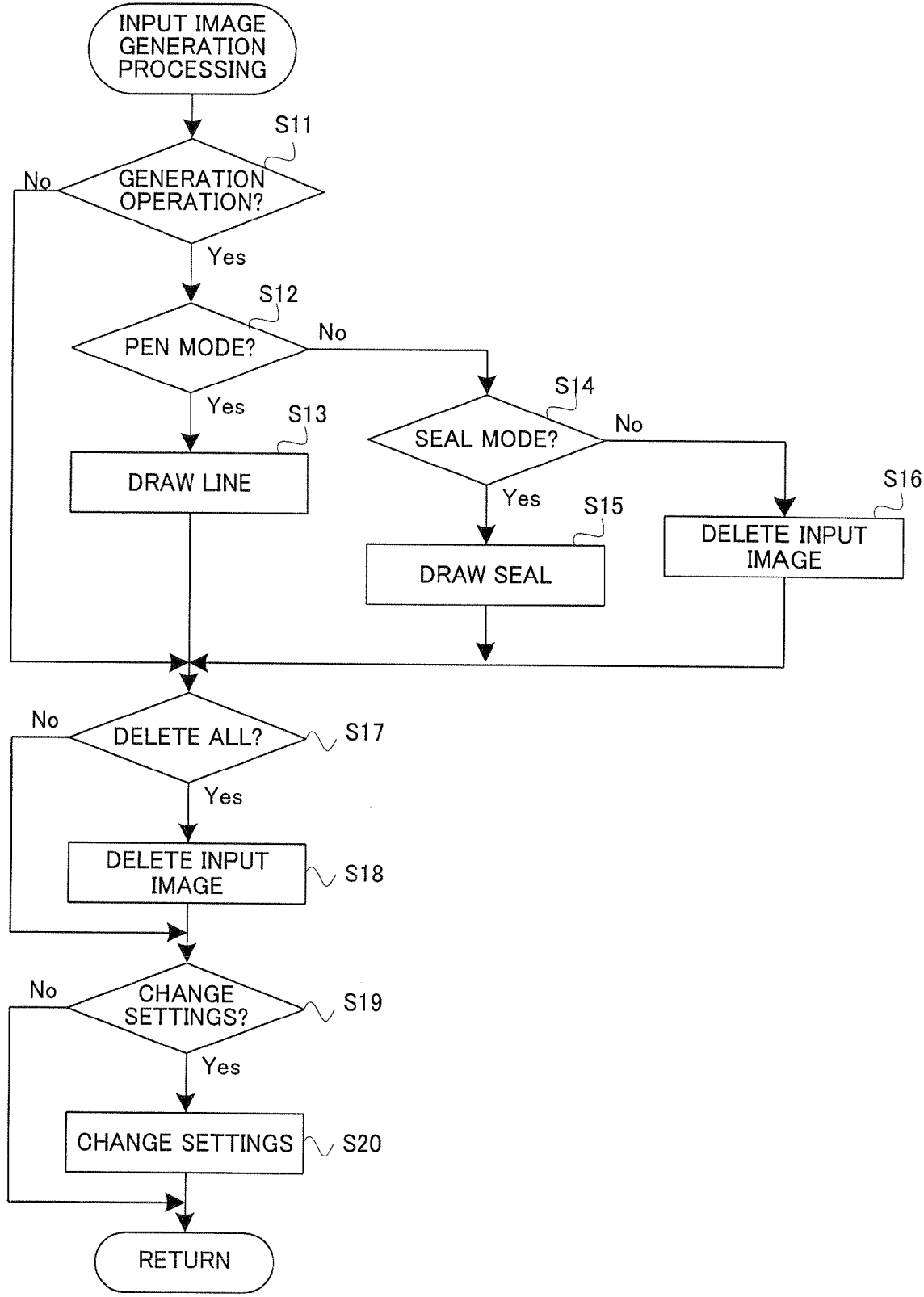
FIG. 13 is a flow chart showing a procedure of input image generation processing (a step S5) shown in FIG. 11.

FIG. 13 is a flow chart showing a procedure of the input image generation processing (the step S5) shown in FIG. 11. In the input image generation processing, at a step S11, the CPU 31 determines whether or not an operation for generating an input image has been performed. In other words, the CPU 31 determines whether or not an input to touch, among the input surface of the touch panel 13, an area where the taken image is displayed has been performed. The determination at the step S11 can be made by determining whether or not the touch position data obtained at the step S2 indicates a position in the area where the taken image is displayed. When a result of the determination at the step S11 is positive, processing at a step S12 is executed. On the other hand, when the result of the determination at the step S11 is negative, processing at a later-described step S17 is executed.

At the step S12, the CPU 31 determines whether or not a current editing mode is the pen mode. It is noted that in the exemplary embodiment, the editing mode is set to the pen mode at a time of start of the editing processing. When a result of the determination at the step S12 is positive, processing at a step S13 is executed. On the other hand, when the result of the determination at the step S12 is negative, processing at a later-described step S14 is executed.

Figure 14:
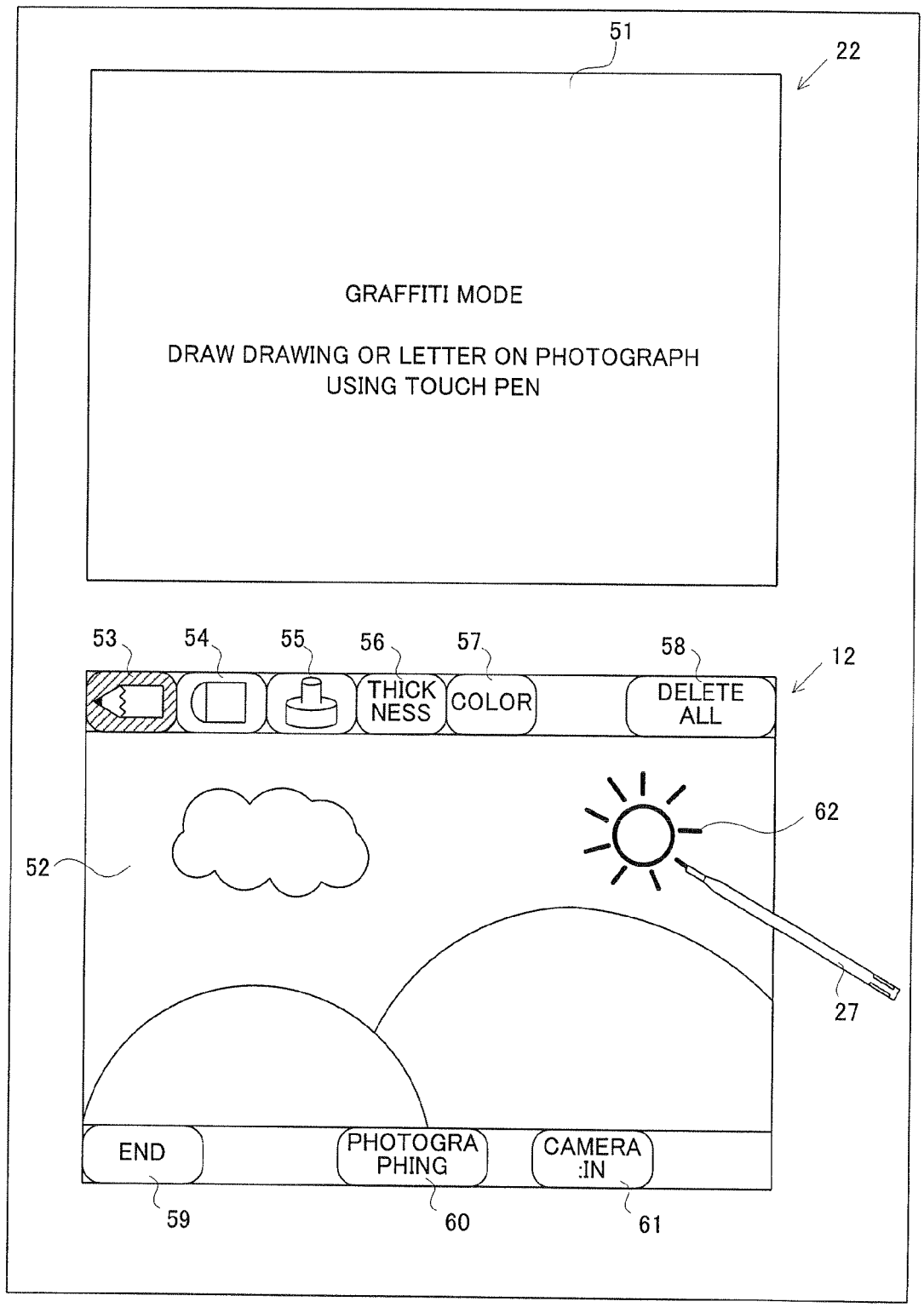
FIG. 14 is a view showing an example of images displayed on the LCDs 12 and 22 in a pen mode.

At the step S13, processing in the pen mode is executed. In other words, the CPU 31 draws an image of a line of a touch input performed on the taken image. More specifically, the CPU 31 draws an image of a line connecting positions indicated by the touch position data which has been obtained at the step S2 until now in a memory (a frame buffer) which stores image data to be displayed on the LCDs 12 and 22. It is noted that a thickness and a color of a drawn line are determined in accordance with content which is set at a later-described step S20. The processing at the step S13 may be any processing as long as the processing is processing of generating and drawing an image showing an line at a position at which an input is performed by the user with respect to the touch panel 13. An example of such processing is shown at later-described steps S52 and S53. FIG. 14 is a view showing an example of images displayed on the LCDs 12 and 22 in the pen mode. When the processing at the step S13 is executed, at later-described display processing (the step S6), an input image showing a line drawn by the user is displayed so as to be superimposed on the taken image displayed on the lower LCD 12 (see FIG. 14). Subsequent to the step S13, processing at a later-described step S17 is executed.

On the other hand, at the step S14, the CPU 31 determines whether or not the current editing mode is the seal mode. When a result of the determination at the step S14 is positive (namely, when the current editing mode is the seal mode), processing at a step S15 is executed. On the other hand, when the result of the determination at the step S14 is negative (namely, when the current editing mode is the eraser mode), processing at a later-described step S16 is executed.

At the step S15, processing in the seal mode is executed. In other words, the CPU 31 draws a predetermined seal image at a position at which a touch input is performed on the taken image. More specifically, the CPU 31 draws the predetermined seal image at a position indicated by the touch position data obtained at the step S2. It is noted that the processing at the step S15 may be any processing as long as the processing is processing of generating and drawing the predetermined seal image at a position at which an input is performed by the user with respect to the touch panel 13. An example of such processing is shown at later-described steps S60 and S61. When the processing at the step S15 is executed, at the later-described display processing (the step S6), the predetermined seal image which is an input image is displayed so as to be superimposed on the taken image displayed on the lower LCD 12. It is noted that the CPU 31 may prepare a plurality of seal images in advance, and may cause the user to select a seal image to be drawn among the plurality of seal images. Subsequent to the step S15, the processing at the later-described step S17 is executed.

On the other hand, at the step S16, processing in the eraser mode is executed. In other words, the CPU 31 deletes the input image (the image of the line or the seal image) on an editing image in accordance with an input with respect to the touch panel 13. More specifically, the CPU 31 deletes the input image drawn at the position indicated by the touch position data obtained at the step S2. Subsequent to the step S16, the processing at the step S17 is executed.

At the step S17, the CPU 31 determines whether or not an instruction to delete all inputs images has been performed. More specifically, the CPU 31 determines whether or not an input to touch an area where the all deletion image 58 is displayed has been performed. When a result of the determination at the step S17 is positive, processing at a step S18 is executed. On the other hand, when the result of the determination at the step S17 is negative, the processing at the step S18 is skipped, and processing at a later-described step S19 is executed.

At the step S18, the CPU 31 deletes all input image which have been generated and drawn until now. Thus, the user can start an operation for drawing an input image from the beginning by touching the all deletion image 58. Subsequent to the step S18, processing at the step S19 is executed.

At the step S19, the CPU 31 determines whether or not an instruction to change settings concerning the operation for generating an input image has been performed. More specifically, the CPU 31 determines whether or not an input to touch an area where each of the button images 53 to 57 is displayed has been performed. When a result of the determination at the step S19 is positive, processing at a step S20 is executed. On the other hand, when the result of the determination at the step S19 is negative, the processing at the step S19 is skipped, and the CPU 31 terminates the input image generation processing.

At the step S20, the CPU 31 changes the settings in accordance with the instruction performed. In other words, when a touch input is performed with respect to any of the mode images 53 to 55, the CPU 31 changes the editing mode to a mode corresponding to a mode image with respect to which the touch input has been performed. When a touch input is performed with respect to the thickness change image 56, the CPU 31 changes settings of a thickness of a line generated in the pen mode. More specifically, the CPU 31 displays a plurality of lines of different thicknesses, causes the user to select a line of a desired thickness among the plurality of lines of different thicknesses, and changes the settings of a thickness of a line to the selected thickness. When a touch input is performed with respect to the color change image 57, the CPU 31 changes a color of a line generated in the pen mode. More specifically, the CPU 31 displays a plurality of images of a plurality of colors, causes the user to select a desired color among the plurality of colors, and changes settings of a color of a line to the selected color. After the end of the step S20, the CPU 31 terminates the input image generation processing.

By the above step S5, the user can input an image on the taken image displayed on the lower LCD 12 (so as to be superimposed on the taken image). It is noted that in the exemplary embodiment, although the processing of adding an image drawn by the user or a seal image prepared in advance to the taken image has been described as an example, in an alternative exemplary embodiment, the CPU 31 may execute processing of distorting the taken image, processing of altering expression of the face (processing of detecting a feature point of the face through image recognition processing, and of changing a position of the feature point) when a face of a person is included in the taken image, processing of converting a taken image into an image which is line symmetrical about a line, and the like.

Referring back to FIG. 11, at the step S6 subsequent to the step S5, the CPU 31 executes the display processing of displaying predetermined images on the LCDs 12 and 22. More specifically, like the image 51 shown in FIG. 12, an image for explaining a manner of an operation to the user is displayed on the upper LCD 12. The taken image obtained at the step S1 and the button images 53 to 61 are displayed on the lower LCD 12 (see FIG. 12). Further, when an input image is generated and drawn in the input image generation processing, the input image is displayed on the taken image (see FIG. 14). It is noted that in the exemplary embodiment, since the processing at the steps S1 to S6 are repeatedly executed, the taken image is different each time. Thus, the user can add an input image on an image taken by the camera 23 or 25 in real time. Subsequent to the step S6, processing at the step S7 is executed.

At the step S7, the CPU 31 determines whether or not a photographing instruction has been performed. In the exemplary embodiment, the photographing instruction is performed by pressing a predetermined button (e.g. the button 14G or the button 14H), or by performing an input to touch an area where the photographing instruction image 60 is displayed with respect to the touch panel 13. Thus, in the determination processing at the step S7, the CPU 31 determines whether or not the predetermined button has been pressed or the input to touch the area where the photographing instruction image 60 is displayed has been performed. The determination at the step S7 can be made by referring to the operation data and the touch position data which are stored in the main memory 32 at the step S2. When a result of the determination at the step S7 is positive, processing at the step S8 is executed. On the other hand, when the result of the determination at the step S7 is negative, processing at the later-described step S9 is executed.

At the step S8, the CPU 31 stores the taken image and the input image which are currently displayed on the lower LCD 12. In other words, data of the taken image and the input image which are displayed at the step S5 are stored in the stored data memory 34. Thus, the user can store the taken image and the input image added on the taken image. Subsequent to the step S8, the processing at the step S9 is executed.

At the step S9, the CPU 31 determines whether to terminate the editing processing. The determination is made by determining whether or not an instruction to terminate the editing processing has been performed by the user. More specifically, the determination at the step S9 is made by determining whether or not a touch input has been performed with respect to an area of the end image 59 displayed on the lower LCD 12. When a result of the determination at the step S9 is negative, the CPU 31 executes the processing at the step S1 again. After that, the processing loop of the steps S1 to S9 is repeatedly executed until the photographing processing is determined to be terminated at the step S9. On the other hand, when the result of the determination at the step S9 is positive, the CPU 31 terminates the photographing processing shown in FIG. 11.

By the photographing processing descried above, the user can store an image taken by the camera in accordance with the photographing instruction. In the exemplary embodiment, the two display devices are included, an image being currently taken is displayed on one of the display devices, and an image for explaining an operation is displayed on the other display device. Thus, since the user can perform the photographing operation while looking at the image for explaining the operation as well as the currently taken image, the user-friendly imaging apparatus 10 can be provided. Further, in the exemplary embodiment, by providing the touch panel 13 in the lower LCD 12, an operation can be performed more easily.

Further, in the exemplary embodiment, the user can perform the photographing operation by pressing the button 14G or the button 14H. By using the button 14G or the button 14H as the shutter button, the user can press the shutter button while holding the lower housing 11 with both hands. Thus, the photographing operation can be performed more easily. In an alternative exemplary embodiment, some of the buttons 14B to 14E may be used as the shutter button. In this case, similarly as in the exemplary embodiment, the user can press the shutter button while holding the lower housing 11 with both hands. Alternatively, some buttons of the direction input button A (e.g. one direction input; e.g. a left input) and one of the buttons 14B to 14E (e.g. the button 14D) may have a function of the shutter button. By doing so, either a left-handed user or a right-handed user can easily operate the shutter button.

(Modified Example of Photographing Processing)

In the above exemplary embodiment, in the photographing processing, the case where the user adds an input image to an image obtained in real time has been described as an example. However, in the photographing processing, the user may add an input image to an image (a still image) taken by the imaging apparatus 10. The following will describe a modified example of the photographing processing with reference to FIGS. 18 to 22.

Figure 18:
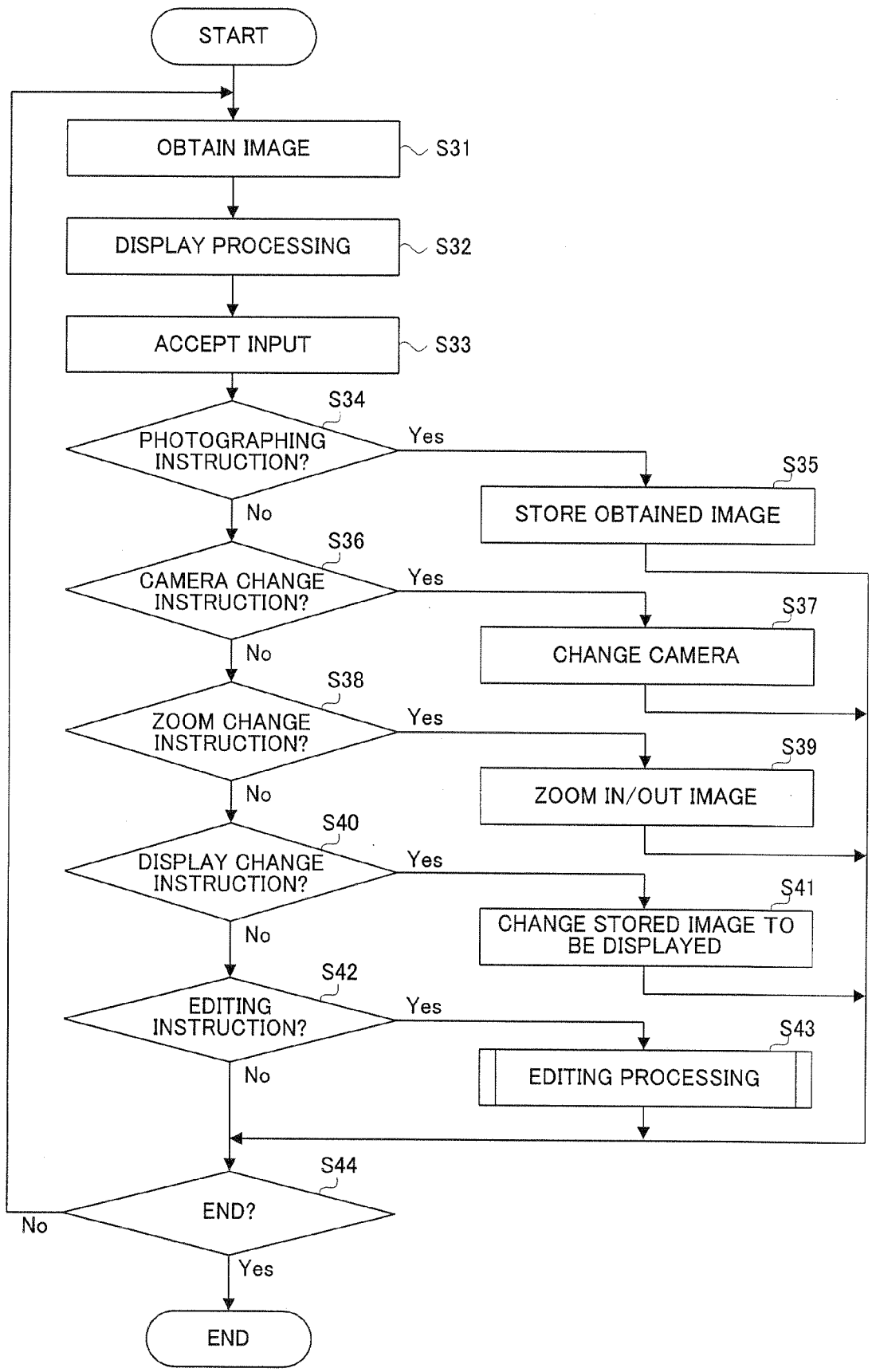
FIG. 18 is a flow chart showing a procedure of photographing processing according to the modified example.

FIG. 18 is a flow chart showing a procedure of photographing processing according to the modified example. When the power is applied to the imaging apparatus 10 by pressing the power button 14F, the CPU 31 of the imaging apparatus 10 initializes the main memory 32 and the like, and then starts executing a program for executing the photographing processing shown in FIG. 18. It is noted that a processing loop of steps S31 to S44 is executed every a predetermined time period (e.g. every 1/60 sec.) except for a period when editing processing (the step S43) is executed.

At the step S31 shown in FIG. 18, the CPU 31 obtains data of an image taken by the inner camera 23 or the outer camera 25. In the present modified example, an image is taken by either the camera 23 or 25. At the step S31, the CPU 31 obtains image data only from the camera. In the present modified example, at a time of start of the photographing processing, a camera for taking an image is set to the outer camera 25. Subsequent to the step S31, processing at the step S32 is executed.

Figure 19:
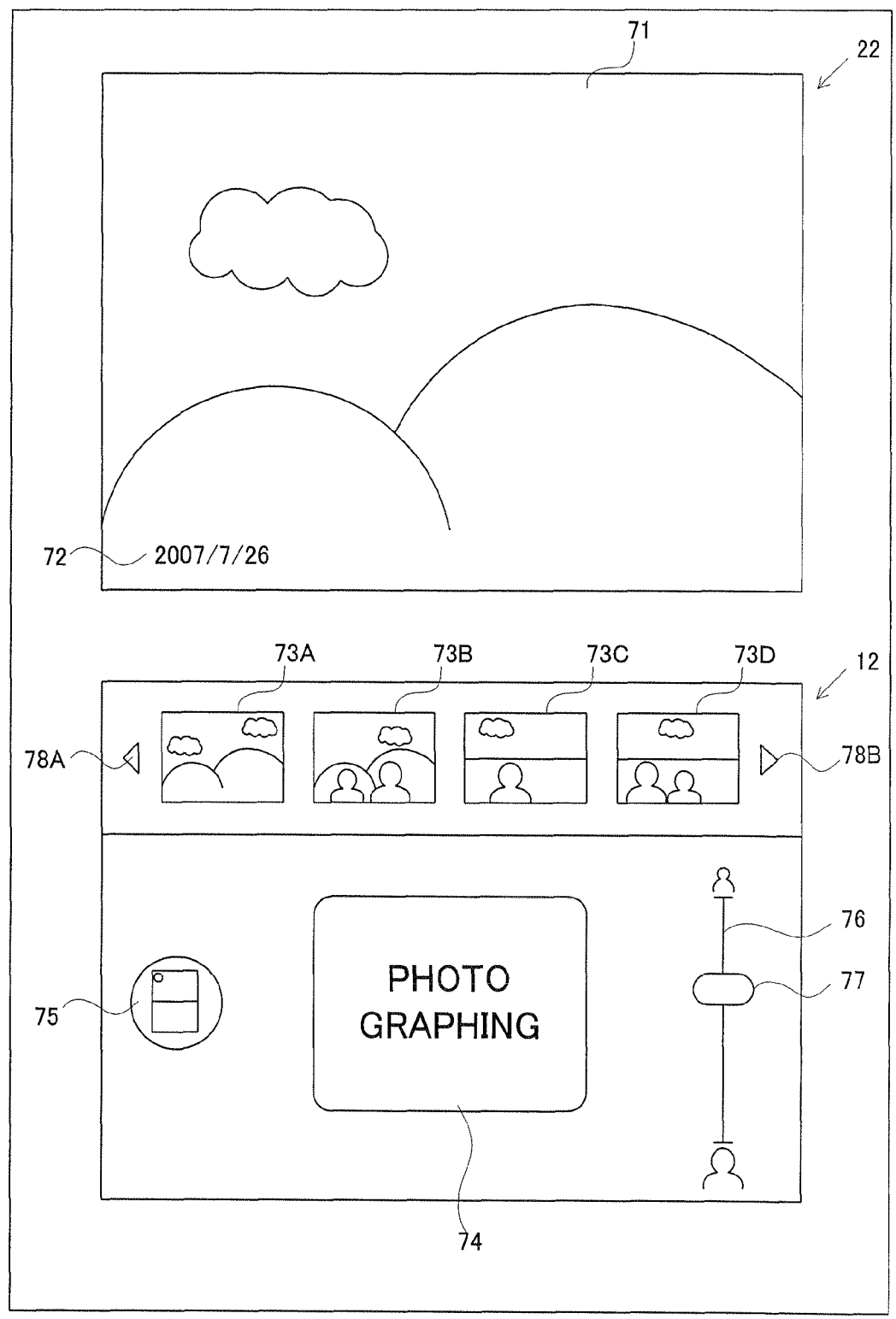
FIG. 19 is a view showing an example of images displayed on the LCDs 12 and 22 at a step S32.

At the step S32, the CPU 31 executes display processing of displaying predetermined images on the LCDs 12 and 22. FIG. 19 is a view showing an example of images displayed on the LCDs 12 and 22 at the step S32. As shown in FIG. 19, the CPU 31 causes a real-time image (a taken image) 51 taken by the camera 23 or 25 to be displayed on the upper LCD 22. In other words, the CPU 31 outputs the image data obtained at the step S31 to the upper LCD 22. Further, in the present modified example, an image 72 showing a current date is displayed on the upper LCD 22 so as to be superimposed on the taken image 71.

In the present modified example, magnification data indicative of a magnification of the taken image displayed on the upper LCD 22 is stored in the main memory 32. At the step S32, the taken image is displayed on the upper LCD 22 with a magnification indicated by the magnification data. In other words, the CPU 31 determines an area in the taken image to be displayed in accordance with the magnification, zooms in an image of the determined area to have a size of the upper LCD 22 as needed, and displays the image on the upper LCD 22. It is noted that at a time of start of the photographing processing, the magnification data is set so as to indicate a predetermined magnification (e.g. a magnification (one time) with which an entirety of the taken image is displayed on the upper LCD 22). Content of the magnification data is changed when a later-described zoom change instruction is performed. Thus, when the taken image is zoomed in and displayed on the upper LCD 22, not the entirety but only a part of the taken image may be displayed.

On the other hand, the CPU 31 causes an operation screen for operating the imaging apparatus 10 to be displayed on the lower LCD 12. As shown in FIG. 32, the operation screen displayed at the step S32 includes stored images 73A to 73D, and instruction images 74 to 78 for performing various instructions with respect to the imaging apparatus 10 using the touch panel 13.

The stored images 73A to 73D are images which are previously taken by the imaging apparatus 10 and stored in the imaging apparatus 10 (or may be stored in the memory card 28) (referred to as stored images). In the present modified example, among the stored images, a predetermined number of images are displayed on the lower LCD 12. It is noted that in the main memory 32, data indicative of stored images to be displayed on the lower LCD 12 (displayed stored images) is stored as displayed stored image data. The displayed stored image data is, for example, data indicative of IDs assigned to the stored images. In FIG. 19, the stored images 73A to 73D are aligned and displayed in order of date (time and date) when photographing is performed. Here, the leftmost stored image 73A is an image taken at the oldest time, and a photographing time becomes recent in order of the stored image 73B which is second from the left, the stored image 73C which is second from the right, and the rightmost stored image 73D. In the present modified example, an instruction to perform editing processing for editing a stored image (an editing instruction) can be performed by performing an input to touch the displayed stored images 73A to 73D with respect to the touch panel 13.

Further, as the above instruction images, the photographing instruction image 74, the camera change image 75, the zoom bar 76, the zoom cursor 77, and the display change images 78A and 78B are displayed on the lower LCD 12. The photographing instruction image 74 is an image for performing a photographing instruction using the touch panel 13. The photographing instruction is an instruction for causing the camera 23 or 25 of the imaging apparatus 10 to perform photographing. The camera change image 75 is an image for performing a camera change instruction using the touch panel 13. The camera change instruction is an instruction to change the camera for taking an image between the inner camera 23 and the outer camera 25. The zoom bar 76 and the zoom cursor 77 are images for performing a zoom change instruction using the touch panel 13. The zoom change instruction is an instruction to zoom in/out the taken image displayed on the upper LCD 22. The display change images 78A and 78B are images for performing a display change instruction. The display change instruction is an instruction to change stored images to be displayed as the stored images 73A to 73D on the lower LCD 12 among the stored images which are stored in the imaging apparatus 10. A manner for performing each of these instructions, and processing executed by the imaging apparatus 10 in accordance with each of the instructions will be described later.

Referring back to FIG. 18, subsequent to the step S32, processing at the step S33 is executed. At the step S33, the CPU 31 accepts an input with respect to each input device. In other words, the CPU 31 obtains operation data from the operation section 14, and obtains touch position data from the touch panel 13. The obtained operation data and touch position data are stored in the main memory 32. Subsequent to the step S33, processing at the step S34 is executed.

At the step S34, the CPU 31 determines whether or not the photographing instruction has been performed. In the present modified example, the photographing instruction is performed by pressing a predetermined button (e.g. the button 14G or the button 14H), or by performing an input to touch an area where the photographing instruction image 74 is displayed with respect to the touch panel 13. Thus, in the determination processing at the step S34, the CPU 31 determines whether or not the predetermined button has been pressed or the input to touch the area where the photographing instruction image 74 is displayed has been performed. The determination at the step S34 can be made by referring to the operation data and the touch position data which are stored in the main memory 32 at the step S33. When a result of the determination at the step S34 is positive, processing at the step S35 is executed. On the other hand, when the result of the determination at the step S34 is negative, processing at the later-described step S36 is executed.

At the step S35, the CPU 31 executes the photographing processing. In other words, the CPU 31 stores the image data obtained from the camera at the step S31 in the stored data memory 34. In an alternative exemplary embodiment, the CPU 31 may cause the image data obtained from the camera at the step S31 to be displayed on either the LCD 12 or 22, and inquire of the user whether or not to store the image data. Only when the user performs an instruction to store the image data, the CPU 31 may store the image data in the stored data memory 34. Further, in an alternative exemplary embodiment, the CPU 31 may store data of the taken image in the memory card 28, or may cause the user to select which the image data is to be stored in an apparatus body (the stored data memory 34) or in the memory card 28. Subsequent to the step S35, processing at the later-described step S42 is executed.

On the other hand, at the step S36, the CPU 31 determines whether or not the camera change instruction has been performed. In the present modified example, the camera change instruction is performed by pressing a predetermined button (e.g. the button 14B, the button 14C, the button 14D, or the button 14E), or by performing an input to touch an area where the camera change image 75 is displayed with respect to the touch panel 13. Thus, in the determination processing at the step S36, the CPU 31 determines whether or not the predetermined button has been pressed or the input to touch the area where the camera change image 75 is displayed has been performed. The determination at the step S36 can be made by referring to the operation data and the touch position data which are stored in the main memory 32 at the step S33. When a result of the determination at the step S36 is positive, processing at the step S37 is executed. On the other hand, when the result of the determination at the step S36 is negative, processing at the later-described step S38 is executed.

At the step S37, the CPU 31 changes the camera for taking an image. In other words, when the camera for taking an image is the inner camera 23, the CPU 31 changes the camera for taking an image to the outer camera 25. When the camera for taking an image is the outer camera 25, the CPU 31 changes the camera for taking an image to the inner camera 23. More specifically, the CPU 31 gives an instruction to stop an operation to one of the cameras 23 and 25 taking an image, and gives an instruction to perform imaging (an imaging performing instruction) to the other camera. When the processing at the step S37 is executed, at the step S31 executed the next time, data of an image taken by the camera after the change is obtained by the CPU 31, and at the step S37 executed the next time, the image taken by the camera after the change is displayed on the upper LCD 22. Subsequent to the step S37, processing at the later-described step S42 is executed.

On the other hand, at the step S38, the CPU 31 determines whether or not the zoom change instruction has been performed. In the present modified example, the zoom change instruction is performed by moving the zoom cursor 77 on the zoom bar 76 upward or downward by a predetermined button (e.g. an up button or a down button of the direction input button 14A) or by an input with respect to the touch panel 13. More specifically, the zoom cursor 77 is moved upward by a predetermined distance in accordance with pressing of the up button of the direction input button 14A, and moved downward by a predetermined distance in accordance with pressing of the down button of the direction input button 14A. In addition, the user can move the zoom cursor 77 upward or downward by touching a screen area where the zoom cursor 77 is displayed, and performing an operation with respect to the touch panel 13 to shift a touch position upward or downward while touching the screen area. Thus, in the determination processing at the step S38, the CPU 31 determines whether the predetermined button has been pressed or the operation for moving the zoom cursor 77 has been performed with respect to the touch panel 13. The determination at the step S38 can be made by referring to the operation data and the touch position data which are stored in the main memory 32 at the step S33. When a result of the determination at the step S38 is positive, processing at the step S39 is executed. On the other hand, when the result of the determination at the step S38 is negative, processing at the later-described step S40 is executed.

At the step S39, the CPU 31 zooms in/out the taken image displayed on the upper LCD 22 in accordance with the zoom change instruction. In other words, when an instruction for moving the zoom cursor 77 upward has been performed, the CPU 31 changes the content of the magnification data stored in the main memory 32 such that the magnification is reduced. Thus, at the step S32 executed the next time, a taken image is zoomed out and displayed as compared to the last step S32. On the other hand, when an instruction for moving the zoom cursor 77 downward has been performed, the CPU 31 changes the content of the magnification data stored in the main memory 32 such the magnification is increased. Thus, at the step S32 executed the next time, a taken image is zoomed in and displayed as compared to the last step S32. Subsequent to the step S39, processing at the later-described step S42 is executed.

On the other hand, at the step S40, the CPU 31 determines whether or not the display change instruction has been performed. In the present modified example, the display change instruction is performed by pressing a predetermined button (e.g. a left button or a right button of the direction input button 14A), or by performing an input to touch an area where the display change image 78A is displayed or an area where the display change image 78B is displayed with respect to the touch panel 13. Thus, in the determination processing at the step S40, the CPU 31 determines whether or not the predetermined button has been pressed or the input to touch the area where the display change image 78A is displayed or the area where the display change image 78B is displayed has been performed. The determination at the step S40 can be made by referring to the operation data and the touch position data which are stored in the main memory 32 at the step S33. When a result of the determination at the step S40 is positive, processing at the step S41 is executed. On the other hand, when the result of the determination at the step S40 is negative, processing at the later-described step S42 is executed.

At the step S41, the CPU 31 changes stored images to be displayed on the lower LCD 12 (displayed stored images) among the stored images. More specifically, when the right button of the direction input button 14A is pressed or when the display change image 78B is touched, the displayed stored images are shifted by one image toward recent images. In other words, among the current four displayed stored images, the image taken at the oldest time is deleted from the displayed stored images. In addition, a stored image taken next to the image taken at the most recent time among the current four displayed stored images is added as a new displayed stored image. On the other hand, when the left button of the direction input button 14A is pressed or when the display change image 78A is touched, the displayed stored images are shifted by one image toward old images. In other words, among the current four displayed stored images, the image taken at the most recent time is deleted from the displayed stored images. In addition, a stored image taken immediately before the image taken at the oldest time among the current four displayed stored images is added as a new displayed stored image. In the main memory 32, data indicative of the displayed stored images after the change at the step S40 is stored as new displayed stored image data. Subsequent to the step S41, processing at the later-described step S42 is executed.

At the step S42, the CPU 31 determines whether or not an editing instruction has been performed. In the present modified example, the editing instruction is performed by performing an input to touch, among the stored images 73A to 73D being displayed, a display area of a stored image which is desired to be edited with respect to the touch panel 13. Thus, in the determination processing at the step S42, the CPU 31 determines whether the input to touch any of the areas where the stored images 73A to 73D are displayed has been performed. The determination at the step S42 can be made by referring to the operation data and the touch position data which are stored in the main memory 32 at the step S33. When a result of the determination at the step S42 is positive, processing at the step S43 is executed. On the other hand, when the result of the determination at the step S42 is negative, processing at the later-described step S44 is executed.

At the step S43, the CPU 31 executes the editing processing. The editing processing is processing for editing a stored image. Hereinafter, a stored image which is an object to be edited is referred to as an editing image. The following will describe the editing processing in detail with reference to FIGS. 20 to 22.

Figure 20:
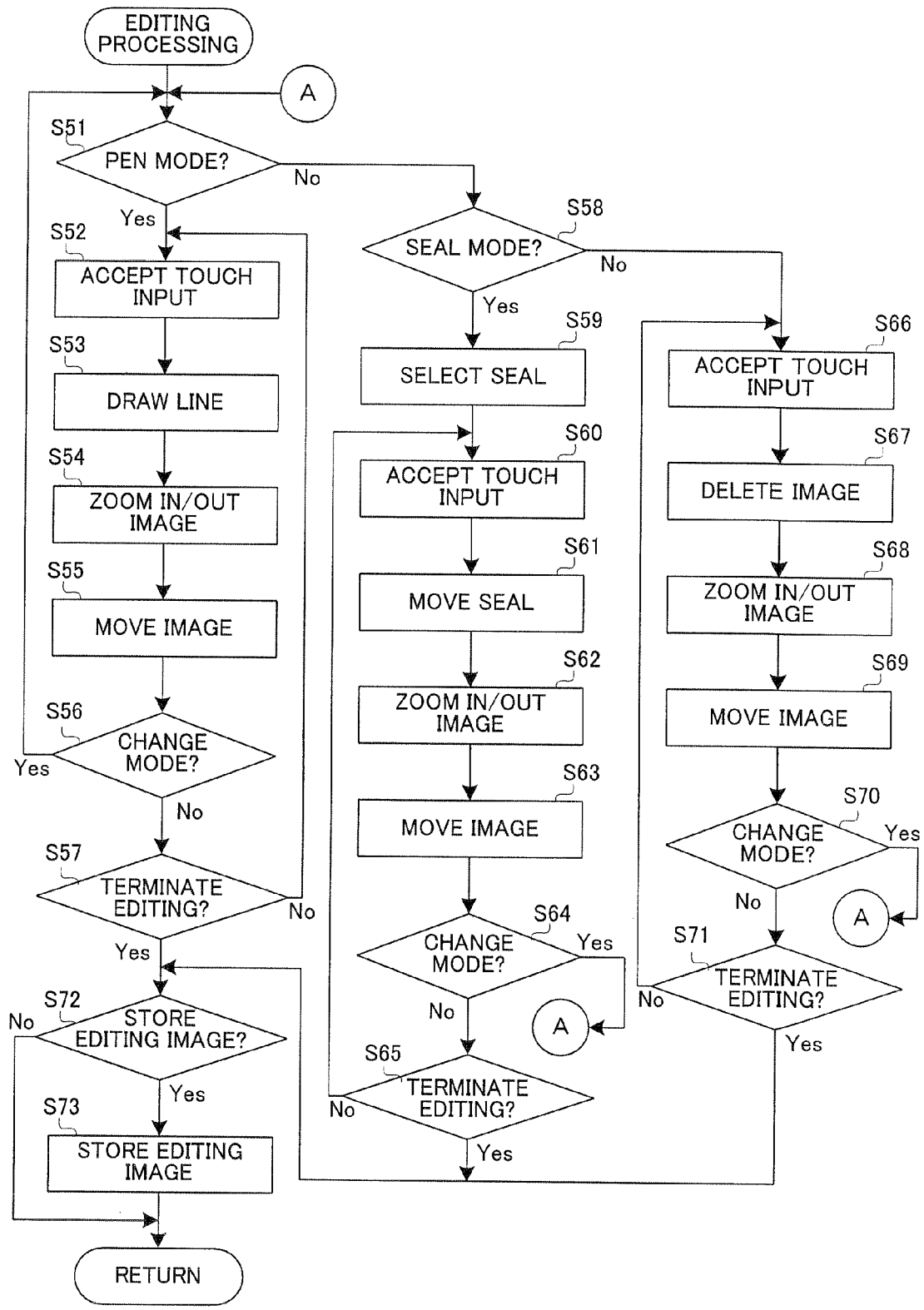
FIG. 20 is a flow chart showing a procedure of editing processing (a step S43) shown in FIG. 18.

FIG. 20 is a flow chart showing a procedure of the editing processing (the step S43) shown in FIG. 18. In the editing processing, at a step S51, the CPU 31 determines whether or not the current editing mode is a pen mode. In the present modified example, in the editing processing, three modes, namely, the pen mode, a seal mode, and an eraser mode, are prepared in advance. In the pen mode, an image of an input line inputted with respect to the touch panel 13 can be added to an editing image. In the seal mode, a seal image prepared in advance can be added to an editing image. In the eraser mode, an image added in the pen mode or the seal mode can be deleted. It is noted in the present modified example, at a time of start of the editing processing, the editing mode is set to the pen mode. When a result of the determination at the step S51 is positive, processing at a step S52 is executed. On the other hand, when the result of the determination at the step S51 is negative, processing at a later-described step S58 is executed.

Figure 21:
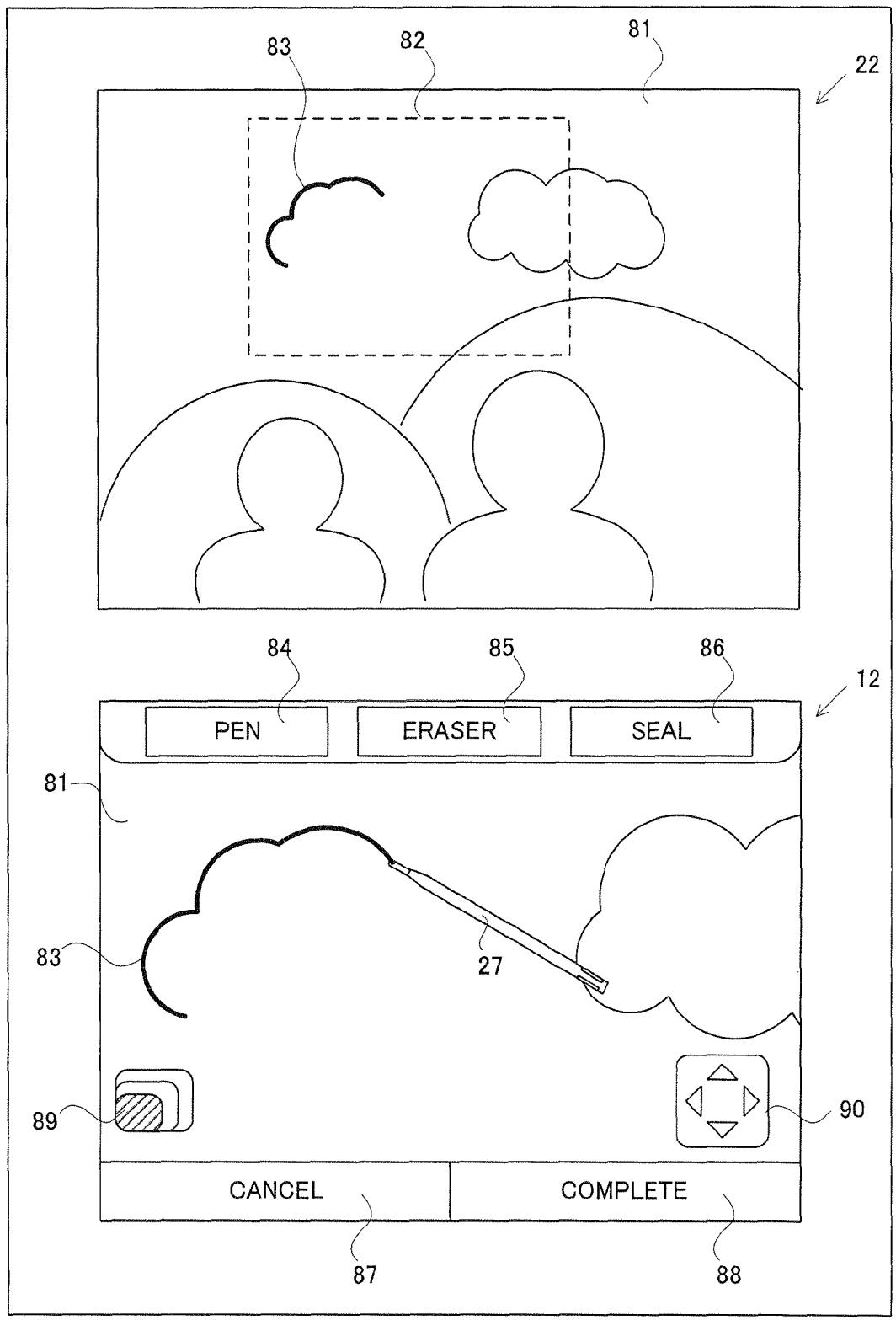
FIG. 21 is a view showing an example of images displayed on the LCDs 12 and 22 in a pen mode of the editing processing.

At the steps S52 to S57, processing in the pen mode is executed. FIG. 21 is a view showing an example of images displayed on the LCDs 12 and 22 in the pen mode of the editing processing. As shown in FIG. 21, during the editing processing, an operation screen for performing editing (an editing screen) is displayed on the lower LCD 12. More specifically, a part or an entirety of an editing image 81 is displayed on the lower LCD 12. The editing image 81 is a stored image which is an object to be edited, namely, a stored image which is designated by an touch input among the stored images 73A to 73D shown in FIG. 19. Further, images 84 to 90 for performing various operations are displayed on the lower LCD 12. Operations using these images 84 to 90 will be described in detail later. On the other hand, during the editing processing, as shown in FIG. 21, the entire editing image 81 is displayed on the upper LCD 22. It is noted that a dotted line area 82 shown in FIG. 21 shows an area in the editing image 81 which is displayed on the lower LCD 12. An image of such a dotted line area 82 may be displayed or may be not displayed on the upper LCD 22. It is noted that since a real-time image taken by the camera 23 or 25 is not displayed during the editing processing, the CPU 31 may give an instruction not to perform an imaging operation to each of the cameras 23 and 25. The following will described the processing in the pen mode (the steps S52 to S57) in detail with reference to FIG. 21.

At the step S52, the CPU 31 accepts an input with respect to the touch panel 13. In other words, the CPU 31 obtains touch position data from the touch panel 13. The obtained touch position data is stored in the main memory 32. Subsequent to the step S52, processing at the step S53 is executed.

At the step S53, the CPU 31 displays an image of an input line 83 in accordance with an input with respect to the touch panel 13. In other words, when a touch input is performed with respect to an area of the editing image 81 on the touch panel 13, the image of the input line 83 is displayed. The input line 83 is an image showing a line at a position at which a touch input is performed using the touch panel 13. More specifically, when the touch position data obtained at the step S52 indicates a position in an area where the editing image 81 is displayed, the CPU 31 adds the image of the input line 83 at the position in the editing image 81. The editing image 81 to which the image is added is displayed on the LCDs 12 and 22. It is noted that since a processing loop of the steps S51 to S56 is repeated every a predetermined time period (one-frame time period (1/60 sec.)) during the pen mode, the processing at the steps S52 and S53 are repeated during the pen mode. Thus, when the user continuously performs an input with respect to the touch panel 13 so as to draw a line, the image of the input line 83 is generated and displayed so as to show the line. It is noted that the generation/display processing of the input line 83 at the step S53 is executed only when a touch input is performed with respect to the area of the editing image 81, and is not executed when a touch input is not performed or when a touch input is performed with respect to an area other than the area of the editing image 81. Subsequent to the step S53, processing at the step S54 is executed.

At the step S54, the CPU 31 executes zoom in/out processing of the editing image 81 displayed on the lower LCD 12. The zoom in/out processing is executed when a magnification change instruction is performed, namely, when an input is performed with respect to an area of a magnification change instruction image 89 displayed on the lower LCD 12 using the touch panel 13. The magnification change instruction image 89 is an image for performing an instruction to zoom in or out the editing image 81 displayed on the lower LCD 12. At the step S54, the CPU 31 changes a magnification for displaying the editing image 81 displayed on the lower LCD 12 when the touch position data obtained at the step S52 indicates a position in the area where the magnification change instruction image 89 is displayed. In the present modified example, the magnification for displaying the editing image 81 has, for example, three levels, and the CPU 31 changes the magnification in order of a small magnification, a medium magnification, and a larger magnification each time the magnification change instruction is performed. When the magnification change instruction is performed in the case of the large magnification, the CPU 31 changes the magnification to the small magnification. Thus, when the magnification change instruction is performed by the user, the magnification for the editing image 81 displayed on the lower LCD 12 is changed. It is noted that the change processing of the magnification at the step S54 is executed only when a touch input is performed with respect to the area of the magnification change instruction image 89, and is not executed when an input is not performed with respect to the touch panel 13 or when a touch input is performed with respect to an area other than the area of the magnification change instruction image 89. Subsequent to the step S54, processing at the step S55 is executed.

At the step S55, the CPU 31 executes movement processing of the editing image 81 displayed on the lower LCD 12. The movement processing is executed when a movement instruction is performed, namely, when a touch input is performed with respect to an area of a movement instruction image 90 displayed on the lower LCD 12. The movement instruction image 90 is an image for performing an instruction to move (scroll) the editing image 81 displayed on the lower LCD 12. At the step S55, the CPU 31 scrolls and displays the editing image 81 displayed on the lower LCD 12 when the touch position data obtained at the step S52 indicates a position in the area where the movement instruction image 90 is displayed. In the present modified example, as shown in FIG. 21, the movement instruction image 90 includes images indicating four directions, namely, an upward direction, a downward direction, a leftward direction, and a rightward direction (triangle images in FIG. 21). When a touch input is performed with respect to any of areas of these images, the CPU 31 scrolls the editing image 81 in a direction corresponding to the image with respect to which the touch input is performed. It is noted that the movement processing at the step S55 is executed only when a touch input is performed with respect to the area of the movement instruction image 90, and is not executed when an input is not performed with respect to the touch panel 13, or when a touch input is performed with respect to an area other than the area of the movement instruction image 90. Subsequent to the step S55, processing at the step S56 is executed.

At the step S56, the CPU 31 determines whether or not to change the editing mode. The determination is performed by determining whether or not a mode change instruction has been performed by the user. More specifically, the determination at the step S56 is made by determining whether or not a touch input has been performed with respect to any of areas of a pen mode image 84, an eraser mode image 85, and a seal mode image 86 which are displayed on the lower LCD 12. The pen mode image 84 is an image for performing an instruction to change the editing mode to the pen mode. The eraser mode image 85 is an image for performing an instruction to change the editing mode to the eraser mode. The seal mode image 86 is an image for performing an instruction to change the editing mode to the seal mode. At the step S56, when the position indicated by the touch position data obtained at the step S52 is a position in the area where any of the pen mode image 84, the eraser mode image 85, and the seal mode image 86 is displayed, the CPU 31 determines that a result is positive. Then, the CPU 31 changes the editing mode to a mode corresponding to the image with respect to which the input is performed. On the other hand, when the position indicated by the touch position data obtained at the step S52 is not a position in the area where any of the pen mode image 84, the eraser mode image 85, and the seal mode image 86 is displayed, the CPU 31 determines that the result is negative. In this case, the editing mode is not changed. When the result of the determination at the step S56 is positive, the processing at the step S51 is executed again. On the other hand, when the result of the determination at the step S56 is negative, processing at the step S57 is executed.

At the step S57, the CPU 31 determines whether or not to terminate the editing processing. The determination is made by determining whether or not an instruction to terminate the editing processing has been performed by the user. More specifically, the determination at the step S57 is made by determining whether or not a touch input has been performed with respect to any of areas of a stop instruction image 87 and a completion instruction image 88 which are displayed on the lower LCD 12. The stop instruction image 87 is an image for performing an instruction to stop the editing processing. The completion instruction image 88 is an image for performing an instruction to complete the editing processing. At the step S57, when the position indicated by the touch position data obtained at the step S52 is a position in the area where any of the stop instruction image 87 and the completion instruction image 88 is displayed, the CPU 31 determines that a result is positive. On the other hand, when the position indicated by the touch position data obtained at the step S52 is not a position in the area where any of the stop instruction image 87 and the completion instruction image 88 is displayed, the CPU 31 determines that the result is negative. When the result of the determination at the step S57 is positive, processing at a later-described step S72 is executed. On the other hand, when the result of the determination at the step S57 is negative, the processing at the step S52 is executed again.

As described above, the processing in the pen mode (the steps S52 and S57) is repeated until the result of the determination at the step S56 becomes positive or until the result of the determination at the step S57 becomes negative. Further, by the user inputting a line with respect to the touch panel 13 in the pen mode, the image of the input line 83 is added to the editing image (see FIG. 21).

On the other hand, at the step S58, the CPU 31 determines whether or not the current editing mode is the seal mode. When a result of the determination at the step S58 is positive (namely, when the current editing mode is the seal mode), processing at a step S59 is executed. On the other hand, when the result of the determination at the step S58 is negative (namely, when the current editing mode is the eraser mode), processing at a later-described step S66 is executed.

Figure 22:
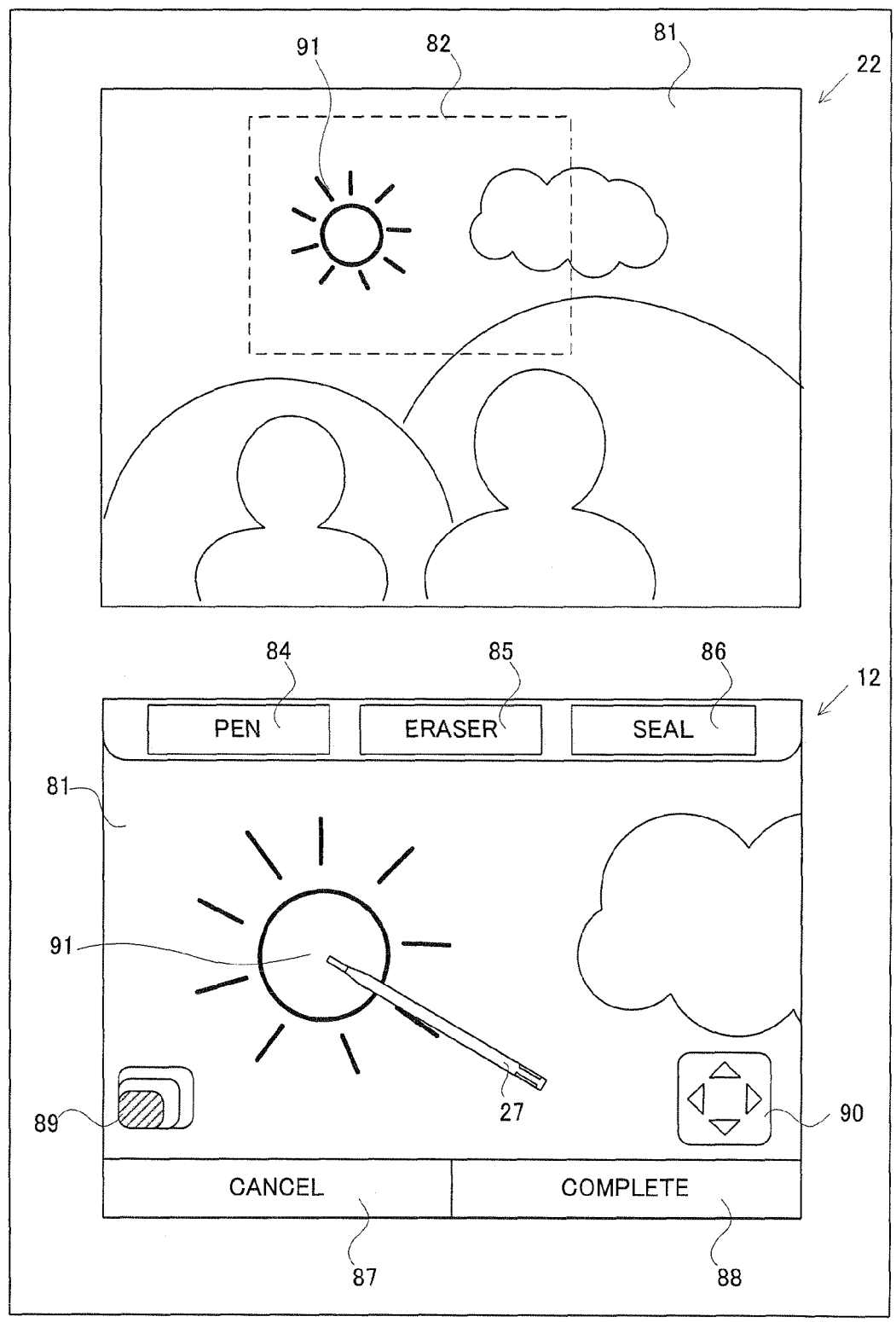
FIG. 22 is view showing an example of images displayed on the LCDs 12 and 22 in a seal mode of the editing processing.

At the steps S59 to S65, processing in the seal mode is executed. FIG. 22 is a view showing an example of images displayed on the LCDs 12 and 22 in the seal mode of the editing processing. As shown in FIG. 22, in the seal mode, similarly as in the pen mode, the editing image 81 is displayed on the LCDs 12 and 22, and the images 64 to 70 for performing various operations are displayed on the lower LCD 12. The following will describe the processing in the seal mode (the steps S59 to S65) in detail with reference to FIG. 22.

At the step S59, the CPU 31 selects a seal image to be added to the editing image 81. The selection of the seal image is made by the user designating a desired seal image among seal images stored in advance in the main memory 32, the stored data memory 34, or the memory card 28. When a seal image is selected at the step S59, the selected seal image is added at a predetermined position (e.g. at a center position) in the editing image 81. Thus, a seal image 91 is added to the editing image 81, and displayed on the LCDs 12 and 22 (FIG. 22). Subsequent to the step S59, processing at the step S60 is executed.

At the step S60, the CPU 31 accepts an input with respect to the touch panel 13. The processing at the step S60 is the same as the processing at the step S52. At the following step S61, the CPU 31 moves the seal image 91 on the editing image 81 in accordance with the input with respect to the touch panel 13. An operation for moving the seal image 91 is performed by the same operation as that for the aforementioned zoom change instruction (the step S38). In other words, the user can move the seal image 91 by touching an area where the seal image 91 is displayed, and by performing an operation with respect to the touch panel 13 to shift a touch position while touching the area. The CPU 31 can detect the operation for moving the seal image 91 by referring to touch position data stored in the main memory 32 at the step S60. It is noted that the movement processing of the seal image 91 at the step S61 is executed only when the operation for moving the seal image 91 is performed, and is not executed when an input is not performed with respect to the touch panel 13, or when an operation other than the operation is performed. Subsequent to the step S61, processing at the step S62 is executed.

At the step S62, the CPU 31 executes zoom in/out processing of the editing image 81 displayed on the lower LCD 12. The processing at the step S62 is the same as the processing at the step S54. In the seal mode, when the magnification for the editing image 81 displayed on the lower LCD 12 is changed, the seal image 91 is zoomed in or out in accordance of zoom in or out of the editing image 81, and a ratio between a size of the editing image 81 and a size of the seal image 91 is not changed. At the following step S63, the CPU 31 executes movement processing of the editing image 81 displayed on the lower LCD 12. The processing at the step S63 is the same as the processing at the step S55. Subsequent to the step S63, processing at the step S64 is executed.

At the step S64, the CPU 31 determines whether or not to change the editing mode. The processing at the step S64 is the same as the processing at the step S56. When a result of the determination at the step S64 is positive, the processing at the step S51 is executed again. On the other hand, when the result of the step S64 is negative, processing at the step S65 is executed.

At the step S65, the CPU 31 determines whether or not to terminate the editing processing. The processing at the step S65 is the same as the processing at the step S57. When a result of the determination at the step S65 is positive, processing at the later-described step S72 is executed. On the other hand, when the result of the determination at the step S65 is negative, the processing at the step S60 is executed again.

As described above, the processing in the seal mode (the steps S60 to S65) is repeated until the result of the determination at the step S64 becomes positive, or until the result of the determination at the step S64 becomes negative. Further, the seal image 91 is added to the editing image 81 in the seal mode, and the user can place a seal image at a desired position by an input with respect to the touch panel 13.

On the other hand, when the result of the determination at the step S58 is negative, namely, when the current editing mode is the eraser mode, processing at steps S66 to S71 are executed. In the eraser mode, similarly as in the pen mode and the seal mode, the editing image 81 is displayed on the LCDs 12 and 22, and the images 64 to 70 for performing various operations are displayed on the lower LCD 12. Further, in the eraser mode, the input line 83 and the seal image 91 which are added during a period from the time of start of the editing processing to a time to shift to the eraser mode are displayed on the LCDs 12 and 22 along with the editing image 81.

At the step S66, the CPU 31 accepts an input with respect to the touch panel 13. The processing at the step S66 is the same as the processing at the step S52. At the following step S67, the CPU 31 deletes the image of the input line 83 or the seal image 91 on the editing image 81 in accordance with the input with respect to the touch panel 13. More specifically, when touch position data obtained at the step S66 indicates a position in an area where the input line 83 added to the editing image 81 or the seal image 91 added to the editing image 81 is displayed, the CPU 31 deletes the image which is added at the position in the editing image 81. Then, the CPU 31 displays the editing image 81 in which the image is deleted on the LCDs 12 and 22. It is noted that the deletion processing of an image at the step S67 is executed only when a touch input is performed with respect to the area of the input line 83 or the area of the seal image 91, and is not executed when an input is not performed with respect to the touch panel 13 or when a touch input is performed with respect to an area other than the area of the input line 83 and the seal image 91. Subsequent to the step S67, the processing at the step S68 is executed.

At the step S68, the CPU 31 executes zoom in/out processing of the editing image 81 displayed on the lower LCD 12. At the step S69, the CPU 31 executes movement processing of the editing image 81. The processing at the steps S68 and S69 are the same as the processing at the steps S54 and S55, respectively.

At the following step S70, the CPU 31 determines whether or not to change the editing mode. The processing at the step S70 is the same as the processing at the step S56. When a result of the determination at the step S70 is positive, the processing at the step S51 is executed again. On the other hand, when the result of the determination at the step S70 is negative, the processing at the step S71 is executed.

At the step S71, the CPU 31 determines whether or not to terminate the editing processing. The processing at the step S71 is the same as the processing at the step S57. When a result of the determination at the step S71 is positive, the processing at the step S72 is executed. On the other hand, when the result of the determination at the step S71 is negative, the processing at the step S66 is executed again.

As described above, the processing in the eraser mode (the steps S66 to S71) is repeated until the result of the determination at the step S640 becomes positive or until the result of the determination at the step S71 becomes negative. Further, in the eraser mode, the image of the input line 83 and the seal image 91 are deleted in accordance with an input with respect to the touch panel 13.

When the editing processing is determined to be terminated at the step S57, S65, or S71, the processing at the step S72 is executed. At the step S72, the CPU 31 determines whether or not to store the editing image 81 which has been edited by the editing processing. The determination is made by determining whether or not a touch input has been performed with respect to any of the areas of the stop instruction image 87 and the completion instruction image 88 based on the touch position data obtained at the step S52, S60, or S66. In other words, when a touch input has been performed with respect to the area of the stop instruction image 87, the CPU 31 stops the editing processing, namely, determines not to store the editing image. On the other hand, when a touch input has been performed with respect to the area of the completion instruction image 88, the CPU 31 completes the editing processing, namely, determines to store the editing image. When a result of the determination at the step S72 is positive, processing at a step S73 is executed. On the other hand, when the result of the determination at the step S72 is negative, the CPU 31 skips the processing at the step S73, and terminates the editing processing shown in FIG. 20.

At the step S73, the CPU 31 stores the editing image 81 in the stored data memory 34. It is noted that the editing image 81 may be written over the stored image before the editing processing, or may be stored independent of the stored image before the editing processing, or the user may be caused to select which the editing image 81 is written over or stored independently of the stored image before the editing processing. Further, the editing image 81 may be stored in the memory card 28 instead of in the stored data memory 34. Subsequent to the step S73, the CPU 31 terminates the editing processing shown in FIG. 20.

According to the editing processing described above, the user can add a letter and a drawing with respect to an editing image by performing an input with respect to the touch panel 13 so as to draw a line. Further, the user can add a seal image at a desired position on the editing image.

Referring back to FIG. 18, subsequent to the editing processing (the step S43), processing at the step S44 is executed. At the step S44, the CPU 31 determines whether or not to terminate the photographing processing. More specifically, the CPU 31 determines whether or not the power button 14F has been pressed. When a result of the determination at the step S44 is negative, the CPU 31 executes the processing at the step S31 again. After that, the processing loop of the steps S31 to S44 is repeatedly executed until the photographing processing is determined to be terminated at the step S44. On the other hand, when the result of the determination at the step S44 is positive, the CPU 31 terminates the photographing processing shown in FIG. 18.

By the photographing processing described above, the user can store the image taken by the camera in accordance with the photographing instruction. In the present modified example, the two display devices are included, an image being currently taken is displayed on one of the display devices, and an operation screen and images previously taken are displayed on the other display device. Thus, the user can perform a photographing operation while looking at the currently taken image displayed on the upper LCD 22 as well as the operation screen and the previously taken image, thereby providing the user-friendly imaging apparatus 10. Further, in the present modified example, by providing the touch panel 13 on the lower LCD 12, an operation is performed more easily.

As described in the above exemplary embodiment, the imaging apparatus may be configured as described below.

(1-1) An imaging apparatus comprises a first housing (the lower housing 11), a second housing (the upper housing 21), a first display section (the lower LCD 12), a first imaging section (the outer camera 25), a plurality of buttons (the buttons 14A to 14E), and a touch panel (13). The first housing has a horizontally long shape. The second housing has a horizontally long shape, and a long side of the second housing is connected to an upper long side of the first housing such that the first and second housings are foldable. The first display section has a display screen which is provided in an inner surface of the first housing which is a surface located inside when the first and second housings are folded. The first imaging section is provided in an outer surface of the second housing which is a surface located outside when the first and second housings are folded, and located at an end of the outer surface of the second housing which is opposite to a connection portion where the second housing is connected to the first housing. The plurality of operation buttons are provided on the inner surface of the first housing and on both sides of the display screen in a longitudinal direction of the first housing. The touch panel is provided on the display screen.

According to the above (1-1), when the user holds the imaging apparatus sideways, the user can firmly hold the imaging apparatus by holding portions of the first housing on both sides of the display screen (portions on which the operation buttons are provided). In this case, hands of the user are located on the operation buttons, not on the display screen. Thus, the display screen is not covered by the hands and does not become invisible, and visibility of the display screen can be maintained. In other words, an imaging apparatus which is capable of being firmly held by the user while maintaining visibility of the display screen when taking an image can be achieved.

Further, according to the above (1-1), the display section and the touch panel are provided in the first housing held by the user. Thus, even when the imaging apparatus is held and used, or even when the imaging apparatus is placed and used on a desk, or the like, an operation with respect to the touch panel is easy to perform (as compared to the case where the touch panel is provided in the second housing).

(1-2) The imaging apparatus may further comprise a second display section (the upper LCD 22) provided in an inner surface of the second housing which is a surface located inside when the first and second housings are folded. In this case, non-display-screen areas (B1 and B2) are provided on the inner surface of the second housing and on both sides of the second display section so as to have widths which are the same as those of areas (A1 and A2) on the inner surface of the first housing on which the plurality of operation buttons are provided.

(1-3) The second housing may have a width which is the same as that of the first housing. In this case, the display screen of the first display section and a display screen of the second display section have the same widths as each other, and are provided in the same position in the longitudinal direction.

(1-4) The imaging apparatus may further comprise a speaker provided inside each of the non-display-screen areas of the second housing.

According to the above (1-2) to (1-4), since the imaging apparatus includes the two display screens, more information can be displayed. Further, according to the configuration in which non-display-screen areas are provided on the second housing and on both sides of the display screen (the above (1-2)), even when the user rotates the imaging apparatus 90 degrees from a state where the imaging apparatus is held sideways to hold the imaging apparatus lengthwise, the user can firmly hold the imaging apparatus. In other words, when the user holds the imaging apparatus lengthwise, the user can support the areas of the first housing on which the operation buttons are provided and the non-display-screen areas with thumbs, and can support a back surface of each housing which is opposite to a surface in which the display screen is provided with index fingers, middle fingers, ring fingers, and little fingers. Thus, while the user can firmly hold the imaging apparatus, the thumbs are not located on the display screen, and visibility of the display screen does not deteriorate. Further, according to the above (1-4), by locating the speaker inside each of the non-display-screen areas of the second housing, the inside space of the second housing can be used effectively, and the imaging apparatus can be made small in size.

(1-5) The second display section may display an image taken by the first imaging section in real time. In this case, the first display section displays an operation screen for performing an operation with respect to the imaging apparatus (see FIG. 19). According to this, the display screen on which the taken real-time image is displayed and the first imaging section for taking an image are provided in the second housing. According to this, if the imaging direction of the first imaging section is changed, a facing direction of the display screen is changed accordingly. Thus, the user can hold the imaging apparatus while intuitively grasping the imaging direction. Further, according to the above, since the operation screen is displayed on the display screen provided in the first housing which is held by the user, the operation screen is displayed on the display screen adjacent to input means (the touch panel and the operation buttons). Thus, the user can easily perform an operation while looking at the operation screen.

(1-6) When a real-time image taken by the first imaging section is displayed on the second display section, the first display section may display an image for performing an input with respect to the touch panel as the operation screen. According to this, an operation with respect to the imaging apparatus can be easily performed using the touch panel.

(1-7) The first display section may display an image for performing editing with respect to a taken image. According to this, the user can easily perform editing processing using the touch panel.

(1-8) The imaging apparatus may further comprise a second imaging section (the inner camera 23) provided in an inner surface of the second housing which is located inside when the first and second housings are folded, and provided on a side closer to the connection portion of the first and second housings than a display screen of the second display section. According to this, the user can take images in two different directions without changing a manner of holding the imaging apparatus. Further, when photographing is performed using the second imaging section, similarly as in the case of using the first imaging section, by adjusting an angle of the second housing, the imaging direction can be easily changed, and the imaging direction of the imaging section can be easily changed without providing a special mechanism. Further, since the second imaging section is not exposed to the outside when the housings are folded, the second imaging section can be protected by folding the housings.

(1-9) The imaging apparatus may further comprise an imaging instruction button (the button 14H) located at a right end of the upper long side of the first housing for performing an instruction to store a taken image. According to this, when holding the first housing, the user can easily press the photographing instruction button with an index finger.

(1-10) The imaging apparatus may further comprise two imaging instruction buttons (the buttons 14H and 14G) located at ends of the upper long side of the first housing, respectively, for performing an instruction to store a taken image. According to this, when holding the first housing, either a right-handed user or a left-handed user can easily press the photographing instruction button with an index finger.

(1-11) Weights of the first housing and components provided in the first housing may be heavier than those of the second housing and components provided in the second housing.

(1-12) At least a battery, a circuit substrate on which electronic components are mounted, and a connector for detachably connecting to a storage medium may be provided in the first housing.

According to the above (1-11) or (1-12), when the imaging apparatus is placed on a desk, or the like, the imaging apparatus can be hard to fall down. Further, by making the first housing held by the user heavier than the second housing, stability is increased when the imaging apparatus is held, and hand movement can be prevented when taking an image.

(1-13) The second housing may be capable of being opened and fixed with respect to the first housing at an angle smaller than 180 degrees. According to this, by making the angle between the housings become slightly smaller than 180 degrees, the outer surfaces of the housings fit into a shape of a hand, and hence it becomes easier to hold the imaging apparatus.

Further, the imaging apparatus may be configured as described below.

(2-1) An imaging apparatus is configured so as to be capable of transforming between a first mode in which a first housing and a second housing are stacked with each other and a second mode in which the first housing and the second housing are opened. The imaging apparatus comprises at least one photographing button which is provided on a side surface of the first housing in the case where an inner surface of the first housing in the first mode is referred to as a front surface, which side surface is on a side on which the second housing is located in the second mode, for performing an instruction to record an image taken by an imaging section.

(2-2) A second imaging section may be provided substantially at a center of an apparatus main surface in the second mode in a left-right direction. In this case, the imaging apparatus further comprises a plurality of operation buttons which are provided on an inner surface of the first housing in the first mode and on a left side and a right side of the second imaging section.

(2-3) A display screen may be provided substantially at a center of the inner surface of the first housing in the first mode in the left-right direction. In this case, the imaging apparatus further comprises operation buttons which are provided on the inner surface of the first housing and on a left side and a right side of the display screen.

As described above, certain exemplary embodiments are usable as an imaging apparatus, and the like in order to improve operability of a photographing operation, and the like.

While certain exemplary embodiments have been described in detail, the foregoing description is in all aspects illustrative and not restrictive. It is understood that numerous other modifications and variations can be devised without departing from the described exemplary embodiments.

What is claimed is:

1. An imaging apparatus comprising:
a first imaging section;
a first housing;
first and second buttons located in one of the side surfaces of the first housing at first and second ends thereof respectively; and
an input section arranged on a main surface of the first housing, which is referred as a front surface thereof in the case where the side surface on which the first and second buttons are located is referred to as an upper surface;
wherein the input section, the first button, and the second button concurrently work as operating sections for photographing through the first imaging section.

2. The imaging apparatus according to claim 1, wherein the input section is mounted on the front surface of the first housing, and arranged substantially symmetrically in a left-right direction.

3. The imaging apparatus according to claim 1, wherein the input section is a coordinate input section.

4. The imaging apparatus according to claim 3, the imaging apparatus further comprising:
a first display section on which the input section is mounted, and which displays an image;
wherein the photographing through the first imaging section is performed by a coordinate input to the input section, an input position of which corresponds to the position where the image is displayed.

5. The imaging apparatus according to claim 4, wherein an image taken through the first imaging section is shown on the first display section.

6. The imaging apparatus according to claim 1, further comprising:
a second housing which is positionally movable in relation to the first housing; and
a second display section mounted on the second housing;
wherein the positional movement of the second housing allows a closed state and an open state, the closed state having the main surface of the first housing covered entirely or partially by the second housing, and the open state having the covered portion of the main surface uncovered entirely or partially;
the second housing in the open state, compared to the closed state, is biased to and engaged with the side of the first housing where the first and second buttons are located; and
the second display section in the open state faces the same space as the main surface of the first housing.

7. The imaging apparatus according to claim 6, wherein an image taken through the first imaging section is shown on the second display section.

8. The imaging apparatus according to claim 6, wherein the input section is covered with the second housing in the closed state, and uncovered in the open state.

9. The imaging apparatus according to claim 6, wherein the first and the second buttons in the open state are concealed by the second housing as viewed from the second display section mounting side.

10. The imaging apparatus according to claim 1, further comprising a second imaging section,
wherein the first imaging section is provided in a position which is exposed to the outside in the open state and in the closed state; and
the second imaging section is provided in a position which is exposed to the outside in the open state, and covered with the housings in the closed state.

11. The imaging apparatus according to claim 6, wherein further comprising a second imaging section,
wherein the first and the second imaging sections are located on the second housing,
wherein the first imaging section is provided in a position which is exposed to the outside in the open state and in the closed state; and
the second imaging section is provided in a position which is exposed to the outside in the open state, and covered with the housings in the closed state.

12. The imaging apparatus according to claim 1, wherein operation buttons are provided on the main surface in the sides of the input section thereon.

13. An imaging system comprising:
a first imaging section;
a first housing;
first and second buttons located in one of the side surfaces at first and second ends thereof respectively; and
an input section arranged on a main surface of the first housing, which is referred as a front surface thereof in the case where the side surface on which the first and second buttons are located is referred to as an upper surface;
wherein the input section, the first button, and the second button concurrently work as operating sections for photographing through the first imaging section.

* * * * *